(12) United States Patent
Arakawa et al.

(10) Patent No.: US 7,870,105 B2
(45) Date of Patent: Jan. 11, 2011

(54) METHODS AND APPARATUS FOR DEDUPLICATION IN STORAGE SYSTEM

(75) Inventors: Hiroshi Arakawa, Sunnyvale, CA (US); Yoshiki Kano, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 478 days.

(21) Appl. No.: 11/943,494

(22) Filed: Nov. 20, 2007

(65) Prior Publication Data
US 2009/0132619 A1 May 21, 2009

(51) Int. Cl.
*G06F 17/30* (2006.01)
*G06F 7/22* (2006.01)

(52) U.S. Cl. ........................................ 707/692; 707/814
(58) Field of Classification Search ........................ None
See application file for complete search history.

(56) References Cited

U.S. PATENT DOCUMENTS

| | | | |
|---|---|---|---|
| 6,233,607 B1 * | 5/2001 | Taylor et al. | 709/217 |
| 6,704,730 B2 | 3/2004 | Moulton et al. | |
| 7,065,619 B1 | 6/2006 | Zhu et al. | |
| 2006/0059207 A1 | 3/2006 | Hirsch et al. | |
| 2007/0043734 A1 * | 2/2007 | Cannon et al. | 707/10 |

OTHER PUBLICATIONS

A-Sis Deduplication Overview, Network appliance provides file storage system (NAS) using deduplication: http://www.netapp.com/products/storage-systems/near-line-storage/asis-dedup.html.

* cited by examiner

*Primary Examiner*—Tim T. Vo
*Assistant Examiner*—Sangwoo Ahn
(74) *Attorney, Agent, or Firm*—Sughrue Mion, PLLC

(57) ABSTRACT

In one implementation, a storage system comprises host computers, a management terminal and a storage system having block interface to communicate with the host computers/clients. The storage system also incorporates a deduplication capability using chunks (divided storage area). The storage system maintains a threshold (upper limit) with respect to the degree of deduplication (i.e. number of virtual data for one real data) specified by users or the management software. The storage system counts the number of links for each chunk and does not perform deduplication when the number of reduced data for a chunk exceeds the threshold, even if duplication is detected. In another implementation, the storage system additionally incorporates a data migration capability and migrates physical data to high reliability area such as area protected with double parity (i.e. RAID6) when the deduplication level for a chunk exceeds the threshold.

21 Claims, 21 Drawing Sheets

| Parity Group ID | Number of Disks | RAID type | Disk ID | Capacity (GB) |
|---|---|---|---|---|
| 1 | 4 | RAID5 | 1 | 1024 |
| | | | 2 | 1024 |
| | | | 3 | 1024 |
| | | | 4 | 1024 |
| 2 | 4 | RAID1 | 9 | 1024 |
| | | | 10 | 1024 |
| | | | 11 | 1024 |
| | | | 12 | 1024 |
| 3 | 4 | RAID6 (double parity) | 5 | 1024 |
| | | | 6 | 1024 |
| | | | 7 | 1024 |
| | | | 8 | 1024 |
| 4 | 4 | RAID6 (double parity) | 13 | 1024 |
| | | | 14 | 1024 |
| | | | 15 | 1024 |
| | | | 16 | 1024 |
| : | : | : | : | : |

202

| Parity Group ID | Chunk ID | Usage | Hash value | Number of Links |
|---|---|---|---|---|
| 0 | 0 | In Use | a88d359a25a117bfdfffe9def486761070885e3c | 1 |
| | 1 | Unused | - | 0 |
| | 2 | In Use | 2843dd45eab33b477ce1973da48f9274fdd3458e | 3 |
| | : | | | |
| 1 | 0 | In Use | 4f9ec88d32ab8b652dc44f2f828537dfe98ac889 | 5 |
| | 1 | In Use | 1f6d6637c06ebb2f8c354533ec17a48dea3d9808 | 2 |
| | 2 | Unused | - | 0 |
| | : | | | |
| : | | | | |

| Volume ID | Segment ID | Assigned (Linked) | Linked Chunk | |
|---|---|---|---|---|
| | | | Parity Group ID | Chunk ID |
| 0 | 0 | No | - | - |
| | 1 | Yes | 0 | 30 |
| | 2 | No | - | - |
| | : | | | |
| 1 | 0 | No | - | - |
| | 1 | Yes | 1 | 8 |
| | 2 | Yes | 0 | 12 |
| | : | | | |
| : | | | | |

Fig. 5

| Source | | Destination | | Copy pointer (LBA) |
|---|---|---|---|---|
| Parity Group ID | Chunk ID | Parity Group ID | Chunk ID | |
| 1 | 8 | 3 | 2 | 16 |
| 2 | 9 | 4 | 3 | 12 |
| : | | | | : |

<Substantial File Info>

222

| Substantial File ID | Hash value | Number of Links |
|---|---|---|
| 0 | a88d359a25a117bfdfffe9def486761070885e3c | 1 |
| 2 | 2843dd45eab33b477ce1973da48f9274fdd3458e | 3 |
| 4 | 4f9ec88d32ab8b652dc44f2f828537dfe98ac889 | 5 |
| 5 | 1f6d6637c06ebb2f8c354533ec17a48dea3d9808 | 2 |
| : | | |

Fig. 21

<Virtual File Info>

223

| Virtual File ID | Linked substantial File |
| | Substantial File ID |
|---|---|
| 1 | 30 |
| 3 | 4 |
| 5 | 8 |
| 6 | 12 |
| : | |

Fig. 22

METHODS AND APPARATUS FOR DEDUPLICATION IN STORAGE SYSTEM

DESCRIPTION OF THE INVENTION

1. Field of the Invention

This invention generally relates to storage technology and, more specifically, to deduplication of data stored in storage systems.

2. Description of the Related Art

Recently, a deduplication technique has been developed for storage systems to in order to reduce the storage area cost and the management costs. With deduplication, when the storage system receives data or file from host computers, the storage system first compares the received data with data or files that have already been stored in the storage system. If the same data or file is detected, the storage system creates compact link information to the detected data or file instead of storing the entire received data or file. In other words, the storage system stores the received data or file in a virtual copy, as opposed to physically storing it on a storage media. By means of deduplication, the amount of used physical storage area in the storage system can be made smaller than the size of the corresponding logical area used by the computers. That is, deduplication enables one to use the physical storage area of a storage system in a more efficient manner.

A deduplication method as applied to a storage system is described in U.S. Pat. No. 7,065,619, incorporated herein in its entirety. U.S. patent publication No. US2006/0059207 to Hirsch et al. shows deduplication method as applied to a storage system such as a virtual tape library. U.S. Pat. No. 6,704,730 shows deduplication method as applied to a computer file system. In addition, Network Appliance provides file storage system (NAS) using deduplication, as described in http://www.netapp.com/products/storage-systems/nearline-storage/asis-dedup.html.

Current deduplication techniques generally have one or more of the following problems. Because deduplication presupposes that multiple virtual data objects are established by only one physical object, it is associated with loosing large amount of data or files when the number of duplication (virtualized data related to one physical data) is large. For example, if the physical data or file is lost due to a storage system failure, a large number of the corresponding virtual data or files may be also lost. In other words, due to deduplication, the damage and impact from unexpected storage failure incidents become larger. Moreover, as other example, if the physical data or file suffers a performance problem, the access to the corresponding virtual data or files also suffers a similar performance problem. Such performance problem can be caused by storage system failure, human error for system mis-configuration, concentration of access load, and the like. This can happen when multiple virtual data objects or files, which correspond to the same physical object, experience simultaneous accesses from multiple clients, thereby resulting in concentration of access load on the respective physical data object. These effects become larger when the degree of deduplication increases.

Thus, the existing technology is deficient in its ability to provide a deduplication technology for a storage system having good reliability characteristics.

SUMMARY OF THE INVENTION

The inventive methodology is directed to methods and systems that substantially obviate one or more of the above and other problems associated with conventional techniques for data deduplication.

In accordance with one aspect of the inventive concept, there is provided a computerized data storage system including: at least one host computer; a management terminal; and a storage system. The storage system in turn includes an interface configured to communicate with the at least one host computer; a storage device having multiple data objects; and a deduplication controller configured to perform a deduplication of data stored in the storage device. The deduplication controller maintains a threshold with respect to allowed degree of deduplication, counts a number of links for each data object and does not perform deduplication when the counted number of links for the data object exceeds the threshold even if duplication is detected.

In accordance with another aspect of the inventive concept, there is provided a computerized data storage system. The inventive storage system includes at least one host computer; a management terminal; and a storage system. The storage system in turn includes: an interface operable to communicate with the at least one host computer; a normal reliability storage area; a high reliability data storage area; a data migration controller configured to migrate data between the normal reliability storage area and the high reliability data storage area; and a deduplication controller configured to perform deduplication of data stored in the normal reliability data storage area or the high reliability data storage area. The deduplication controller maintains a threshold with respect to allowed degree of deduplication and counts a number of links for each object. The deduplication controller is further configured to cause the data migration controller to migrate a data object to the high reliability storage area when the counted number of links for the data object exceeds the threshold.

In accordance with yet another aspect of the inventive concept, there is provided a method performed by a storage system including an interface configured to communicate with at least one host computer and at least one storage device having multiple data objects. The inventive method involves: determining whether a first data is duplicated in the at least one duplicate data object; maintaining a threshold with respect to allowed degree of deduplication; and counting a number of links for the at least one duplicate data object. If the first data is duplicated in the at lest one duplicate data object and if the counted number of links does not exceed the threshold, deduplication of the data in the at least one duplicate data object is performed; and if the counted number of links exceeds the threshold, the deduplication of the data in the at least one duplicate data object is not performed.

In accordance with a further aspect of the inventive concept, there is provided a method performed by a storage system including an interface configured to communicate with at least one host computer and at least one storage device having multiple data objects. The inventive method involves: determining whether the a data is duplicated in the at least one duplicate data object of the multiple data objects; maintaining a threshold with respect to allowed degree of deduplication; and counting a number of links for the at least one duplicate data object. If the first data is duplicated in the at lest one duplicate data object, deduplication of the data in the at least one duplicate data object is performed; and if the counted number of links exceeds the threshold, the at least one duplicate data object is migrated to a high reliability storage area.

In accordance with yet further aspect of the inventive concept, there is provided a computer-readable medium storing a set of instruction, the set of instructions, when executed by a storage system including an interface configured to communicate with at least one host computer and at least one storage device having multiple data objects; causing the storage system to: determine whether a first data is duplicated in the at least one duplicate data object of the multiple data objects; maintain a threshold with respect to allowed degree of deduplication; and count a number of links for the at least one duplicate data object. If the first data is duplicated in the at lest one duplicate data object, deduplication of the data in the at least one duplicate data object is performed; and if the counted number of links exceeds the threshold, the at least one duplicate data object is migrated to a high reliability storage area.

In accordance with yet further aspect of the inventive concept, there is provided a computer-readable medium storing a set of instruction, the set of instructions, when executed by a storage system including an interface configured to communicate with at least one host computer and at least one storage device having data objects; causing the storage system to: determine whether a first data is duplicated in the at least one duplicate data object; maintain a threshold with respect to allowed degree of deduplication; and count a number of links for the at least one duplicate data object. If the first data is duplicated in the at lest one duplicate data object and if the counted number of links does not exceed the threshold, deduplication of the data in the at least one duplicate data object is performed; and if the counted number of links exceeds the threshold, the deduplication of the data in the at least one duplicate data object is not performed.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 4 illustrates an exemplary embodiment of the Chunk information.

FIG. 5 illustrates an exemplary embodiment of the segment information.

FIG. 21 illustrates an exemplary embodiment of Substantial file information.

FIG. 22 illustrates an exemplary embodiment of Virtual file information.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

A. First Embodiment

A.1. System Configuration

Figure 1:
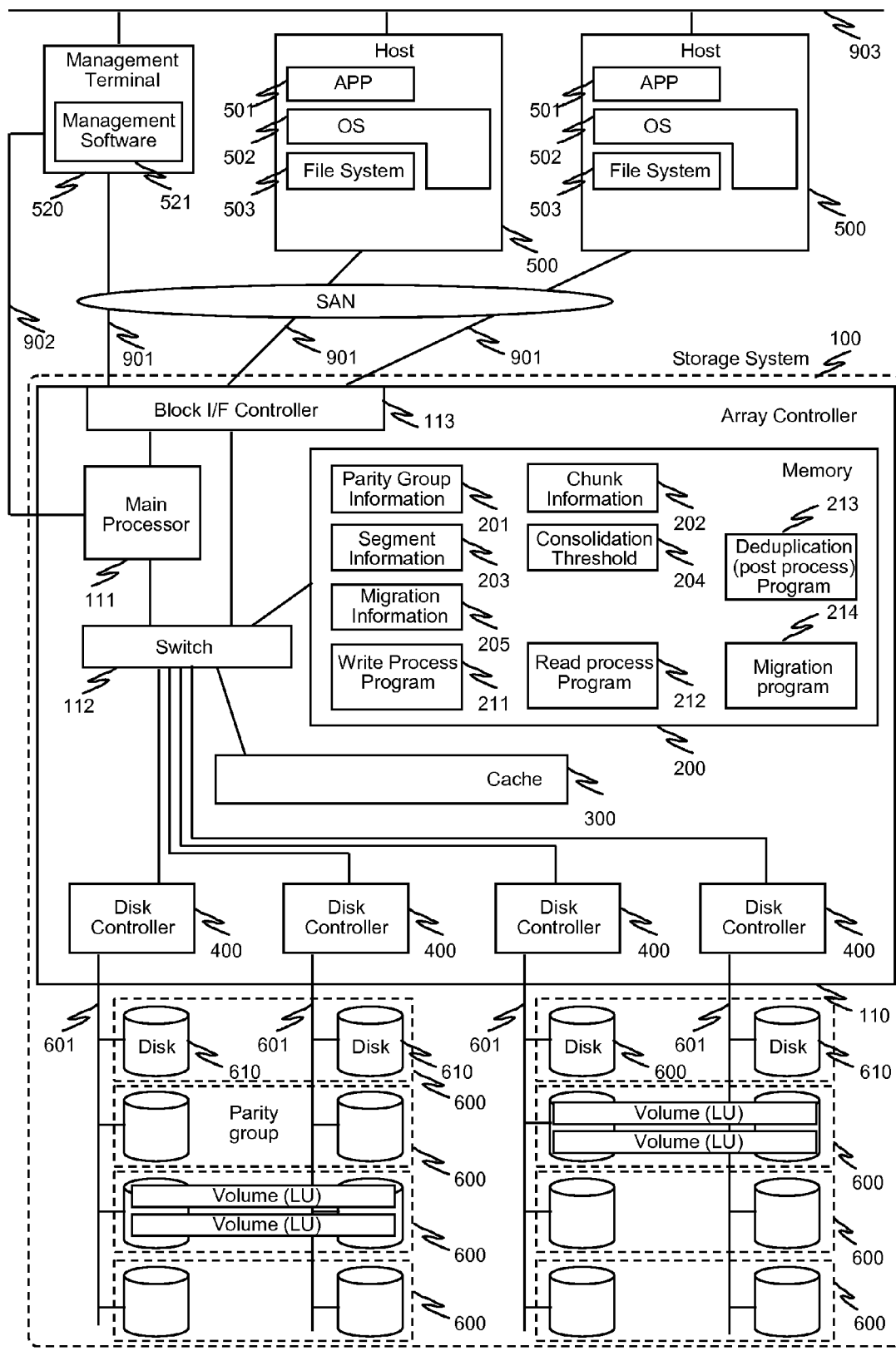
FIG. 1 illustrates an exemplary system configuration of the first embodiment.

FIG. 1 illustrates an exemplary system configuration of the first embodiment of the inventive storage system. A storage system that is related to one embodiment of the invention incorporates one or more of the following components: a Storage system 100, an Array controller 110, a Main processor 111, a Switch 112, a Block I/F controller 113, a Memory 200, a Cache 300, a Disk controller 400, a disk (e.g. HDD) 610 and a Backend path (e.g. Fibre Channel, SATA, SAS, iSCSI(IP)) 601.

The Main processor 111 performs various processes required for proper functioning of the Array controller 110. The Main processor 111 and other components use the following information stored in Memory 200: Parity group information 201; Chunk information 202, Segment information 203, Consolidation threshold 204 and Migration information 205.

The Main processor 111 performs the aforesaid processes by executing the following programs stored in Memory 200: a Write process program 211, a Read process program 212, a Deduplication (post process) program 213 and a Migration program 214. The detailed description of the above processes will be provided below.

The Host 500 and the Management terminal 520 are connected to the Block interface 113 via a SAN 901. This SAN 901 may be implemented using Fibre Channel or iSCSI(IP) technology. The Host 500 and the Management terminal 520 are interconnected via LAN 903 (e.g. IP network). The Management terminal 520 is also connected to the Array controller 110 via out-of-band Network 902, such as an IP-based network.

To facilitate the computing capability, the Host 500 and the Management terminal 520 incorporate various computing resources such as processor and memory (not shown in FIG. 1). The Host 500 also incorporates an application software 501, an OS 502, and a File system 503. In addition, the Management terminal 520 incorporates the Management software 521.

The storage volumes (Logical Units) provided by the Storage system 100 are composed from a collection of storage areas located in HDDs. The data in these volumes may be protected by storing a parity code, which is accomplished by using the RAID configuration and the associated technology. The collection of HDDs that provides a volume is called a Parity group 600. In one embodiment, various parity group configurations (RAID configurations) and various numbers of disks for the parity group can be applied. As one example of a RAID configuration, a double parity configuration (i.e. RAID6) can be applied. With RAID6, the stored data can be recovered even if two HDD in a Parity Group 600 breaks down. Therefore, the RAID6 configuration provides very high reliability for storing data. The aforesaid RAID6 configuration is described in "Building Storage Networks" written by Marc Farley, published in 2000 by the McGraw-Hill Company and incorporated herein by reference.

Figures 2, 3:
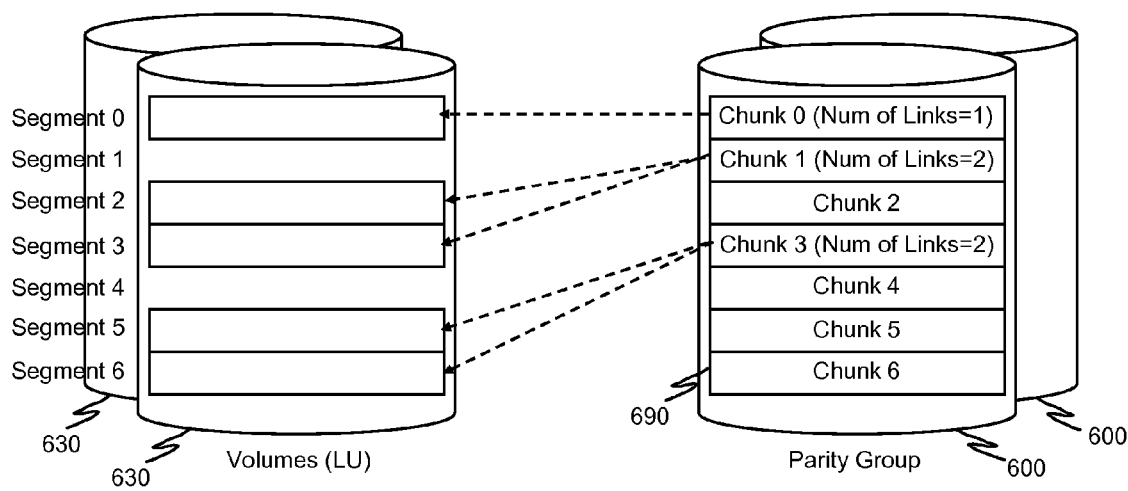
FIG. 2 illustrates an exemplary embodiment of the Parity group information.
FIG. 3 illustrates usage of volumes in an exemplary embodiment of the Storage system.

The Host 500 can store data in the storage volume and access the data stored in the storage volume. In other words, the Host 500 writes data to the storage volume and reads data from the storage volume. The Array controller 110 manages the Parity group 600 using the Parity group information 201. FIG. 2 illustrates an exemplary embodiment of the Parity group information 201. As shown in FIG. 2, the Parity group information 201 includes a parity group ID, a number of disks in each Parity group 600, a type of disk configuration (RAID type), IDs of disks in each Parity group 600 and a capacity information for each disk.

FIG. 3 illustrates exemplary usage of volumes in the Storage system 100. The Storage system 100 provides Volumes 630 (i.e. data storage area) to the Host 500. The Host 500 performs write and read access operations to store/access data in the Volumes 630 via the host paths (e.g. SAN 901). When the new data are stored in the Volumes 630, the Storage system 100 performs deduplication of the contents of the Volume 630. The processes for the aforesaid deduplication operation will be described in detail below. As shown in FIG. 3, the storage area in the Volume 630 is logically divided into multiple segments having a fixed size. On the other hand, the physical storage area provided by a RAID parity group is divided into multiple chunks. The size of a chunk is the same as the size of a segment. The Array controller 110 assigns a chunk to a segment during the write process and stores the data corresponding to the segment in the respective chunk. Moreover, as described below, when the Array controller 110 detects the same content in other segments, the Array controller 110 physically stores in a chunk only one copy of the redundant content and creates a link relationship between multiple segments and one chunk. For example, in FIG. 3, segment 2 and segment 3 has same content stored in the chunk 1.

In order to achieve the above deduplication, the Array controller 110 uses the Chunk information 202 and the Segment information 203. FIG. 4 illustrates an exemplary embodiment of the Chunk information 202. The Chunk information 202 is used to manage physical area in Storage system 100. In FIG. 4, the Chunk information 202 includes parity group ID, chunk ID, usage (status of use), hash value and the information on the number of respective deduplication links. A set of a parity group ID and a chunk ID uniquely identifies the chunk. The hash value is a value which is used to detect the same data. The hash value is semi-unique value calculated based on the data in each chunk. The size of the hash value is smaller than the size of the chunk itself. Therefore, the hash values are easy to compare and, therefore, the hash value are very suitable for use in detecting the same data. The hash value is generated by a hash function such as SHA-1 and SHA-256. The number of links indicates the number of established relations between a chunk (i.e. physical area) and a segment (i.e. logical or virtual area), as shown in FIG. 3. The usage information indicates the current usage of each chunk (i.e. physical area).

FIG. 5 illustrates an exemplary embodiment of the Segment information 203. The Segment information 203 maintains a relation (link) between the chunk (i.e. physical area) and the corresponding segment (i.e. logical or virtual area). In FIG. 5, the Segment information 203 includes a volume ID, a segment ID, a status of the assignment, a parity group ID and a chunk ID of the chunk linked to the segment. A set of volume ID and segment ID uniquely identifies the segment. The status of the assignment is 'No' if no chunk is assigned to the segment while 'Yes' indicates that some chunk has been assigned to the segment. Linked chunk (parity group ID and chunk ID) indicates the chunk linked to the segment. That is, data in the segment is stored in the chunk indicated as the linked chunk. In one embodiment, the above information is stored as list or directory of each element for quick search.

A.2. First Example of Write Process: Limitation of Deduplication

Figure 6:
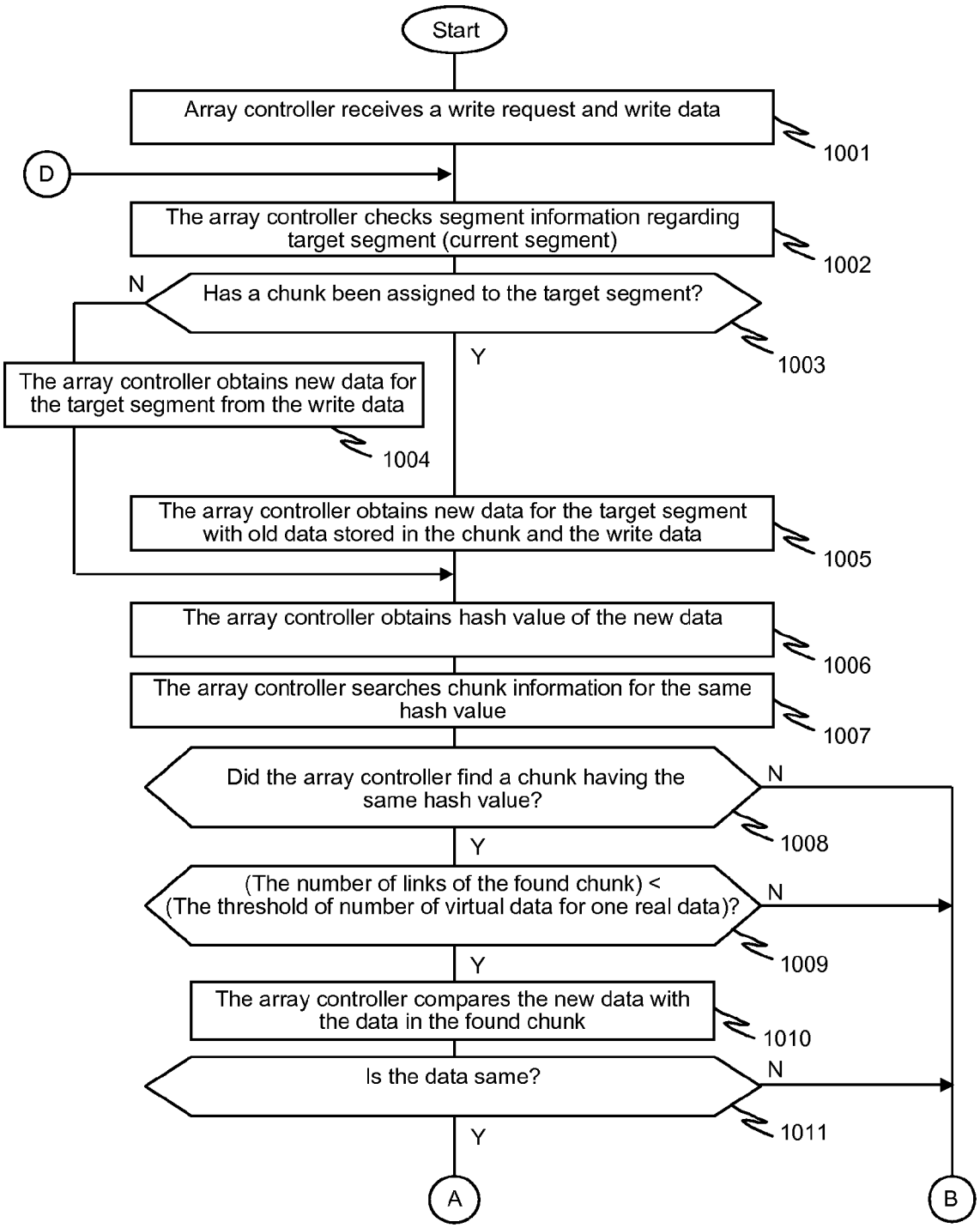
FIG. 6 illustrates the first part of an exemplary embodiment of the write process.

The Storage system 100 performs deduplication as a part of the process for handling a data write request. FIG. 6 illustrates the first part of the exemplary write process. In this part, detection of duplication is performed.

At step 1001, the Array controller 110 receives a write request and the associated data from the Host 500 via the SAN 901. The Array controller 100 then takes the first segment of the target area specified in the write request as the current target segment to be processed.

At step 1002, the Array controller 110 checks the Segment information 203 with respect to the target segment. If the target segment has already had a corresponding chunk assigned at step 1003, the Array controller 110 obtains new data for the target segment from the write data (step 1004). If not, the Array controller 110 obtains the new data from old data stored in the chunk and the write data (step 1005).

At step 1006, the Array controller 110 calculates the hash value of the new data by means of the hash function.

At step 1007, the Array controller 110 searches the Chunk information 202 for the same hash value.

At step 1008, if the Array controller 110 finds a chunk having the same hash value, the process proceeds to step 1009. If not, the process proceeds to step 1201 in FIG. 8.

At step 1009, the Array controller 110 compares the threshold value recorded in Consolidation threshold record 204 with the number of links to the chunk found in step 1008 by referring to the Consolidation threshold 204 and Chunk information 202. The consolidation threshold represents a threshold value for the number of virtual data objects corresponding to one physical data object. In other words, this threshold represents the threshold with respect to the degree of deduplication. If the number of links is smaller than the threshold value, the process proceeds to step 1010. If not, the process proceeds to step 1201 in FIG. 8.

At step 1010, the Array controller 110 compares the new data with the data in the found chunk by binary-level comparison.

Figure 7:
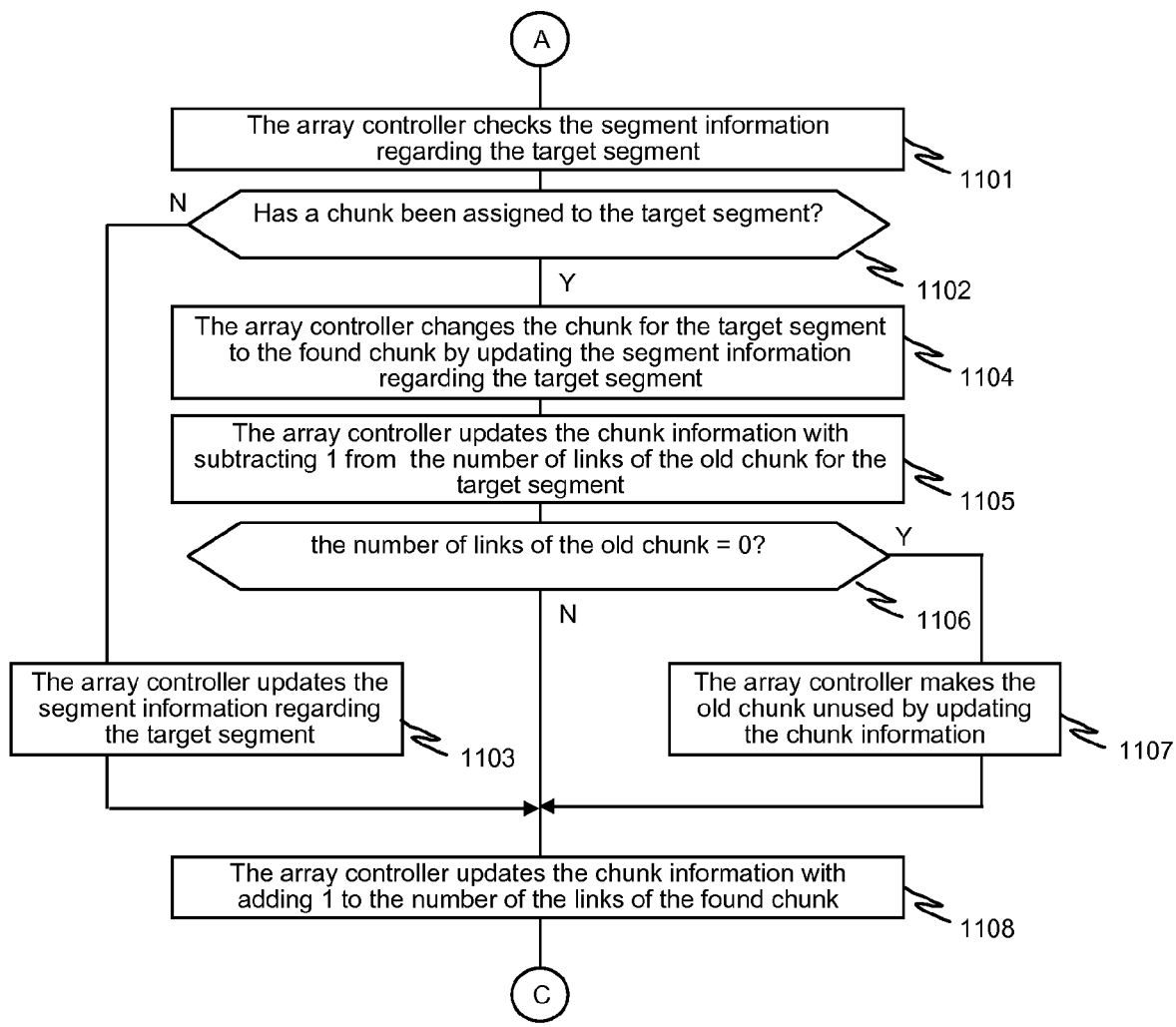
FIG. 7 illustrates the second part of an exemplary embodiment of the write process.

At step 1011, as the result of the comparison, if both data are the same, the process proceeds to step 1101 in FIG. 7. If not, the process proceeds to step 1201 in FIG. 8.

FIG. 7 illustrates the second part of the exemplary write process. In this part, a link (relation) is created or updated instead of physically storing the received data.

At step 1101, the Array controller 110 checks the Segment information 203 in order to locate the target segment.

If the target segment has already had a corresponding chunk assigned at step 1102, the process proceeds to step 1104. If not, the Array controller 110 updates the Segment information 203 to create link between the target segment and the found chunk having same as the new data (step 1103).

At step 1104, the Array controller 110 updates the Segment information 203 by changing the chunk for the target segment to the found chunk having the same data.

At step 1105, the Array controller 110 updates the Chunk information 202 by subtracting 1 from the number of links of the old chunk for the target segment.

If the number of links of the old chunk equals to 0 at step 1106, the Array controller 110 updates the Chunk information 202 to label the old chunk as unused (step 1107). If not, the process proceeds to step 1108.

At step 1108, the Array controller 110 updates the Chunk information 202 by adding 1 to the number of links of the found chunk having the same as the new data. After that, the process proceeds to step 1301 in FIG. 9.

Figure 8:
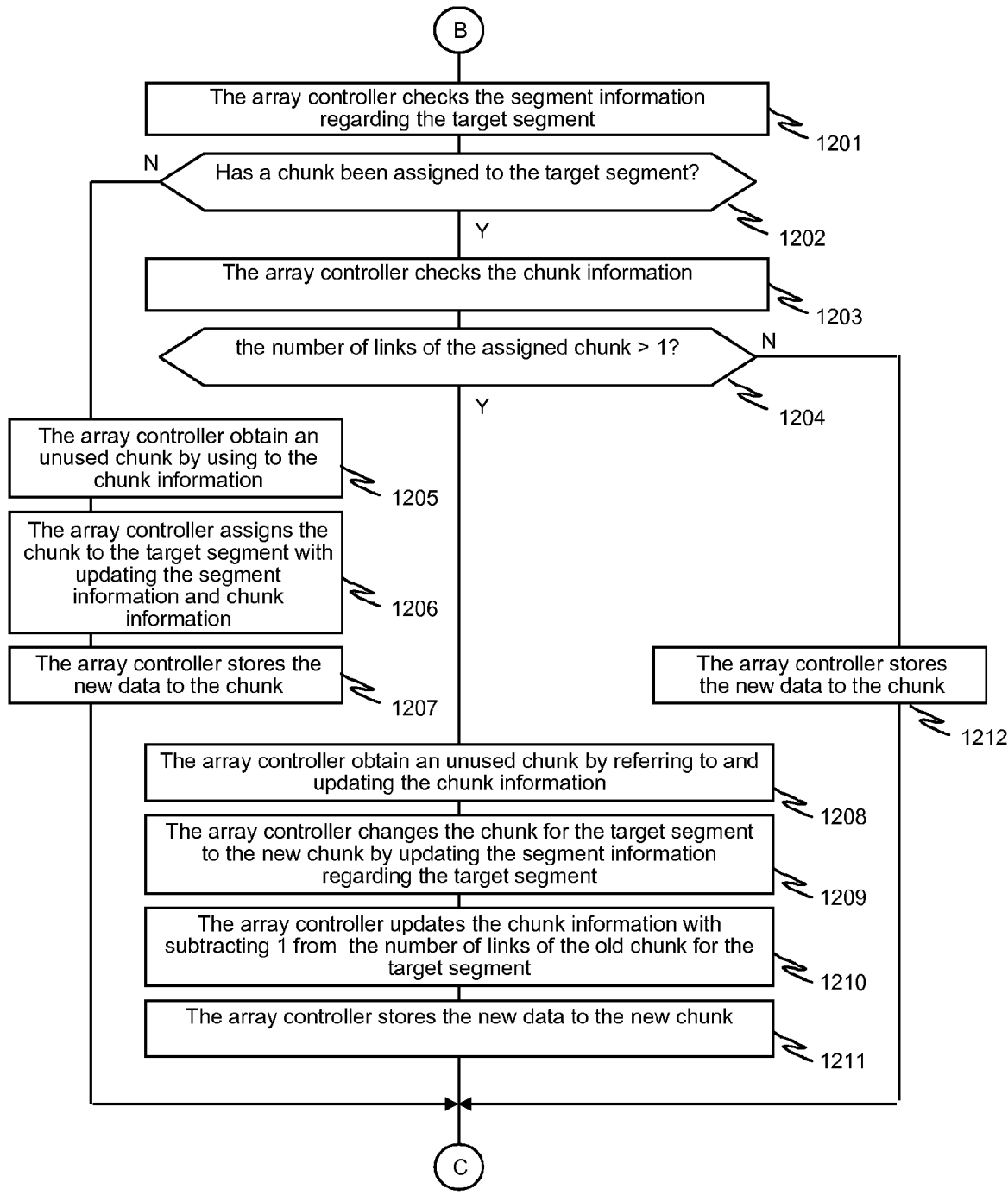
FIG. 8 illustrates the third part of an exemplary embodiment of the write process.

FIG. 8 illustrates the third part of the exemplary write process. In this part, the write data is physically stored.

At step 1201, the Array controller 110 checks the Segment information 203 with respect to the target segment.

At step 1202, if the target segment has already had a corresponding chunk assigned, the process proceeds to step 1203. If not, the process proceeds to step 1205.

At step 1203, the Array controller 110 checks the Chunk information 202 with respect to the assigned chunk.

At step 1204, if the number of links pointing to the assigned chunk is larger than 1, the process proceeds to step 1208. If not, the process proceeds to step 1212.

At step 1205, the Array controller 110 searches the Chunk information 202 for an unused chunk and obtains the unused chunk.

At step 1206, the Array controller 110 updates the Segment information 203 and the Chunk information 202 to assign the chunk to the target segment.

At step 1207, the Array controller 110 stores the new data in the chunk. After that, the process proceeds to step 1301 in FIG. 9.

At step 1208, the Array controller 110 searches the Chunk information 202 for an unused chunk and obtains the unused chunk.

At step 1209, the Array controller 110 updates the Segment information 203 by changing the assignment of the chunk for the target segment to the newly obtained chunk.

At step 1210, the Array controller 110 updates the Chunk information 202 by subtracting 1 from the number of links pointing to the old chunk for the target segment.

At step 1211, the Array controller 110 stores the new data in the new chunk. After that, the process proceeds to step 1301 in FIG. 9.

At step 1212, the Array controller 110 stores the new data in the assigned chunk. After that, the process proceeds to step 1301 in FIG. 9.

Figure 9:
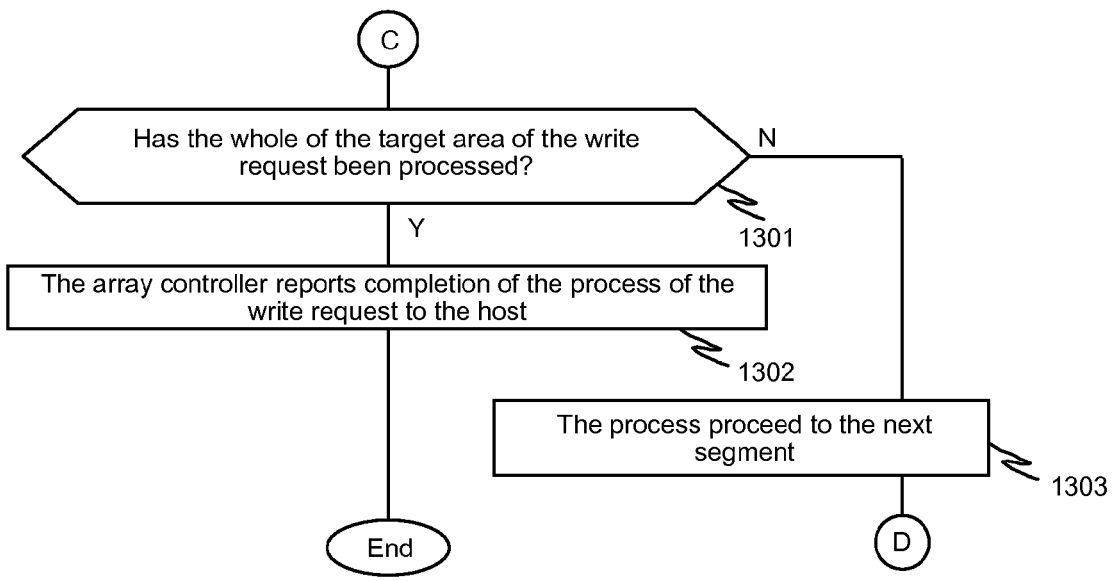
FIG. 9 illustrates the fourth part of an exemplary embodiment of the write process.

FIG. 9 illustrates the fourth part of the exemplary write process. This figure describes the termination condition of the process.

If the whole of the target area of the write request has been processed at step 1301, the Array controller 110 reports completion of the process of the write request to the host (step 1302), and the process terminates. If not, the Array controller 110 designates the next segment as target segment (step 1303), and then the process proceeds to step 1002 in FIG. 6.

In the above process, if the number of links of a chunk reaches the deduplication threshold, further consolidation of the same data (i.e. deduplication) is not performed. User or Management software 521 can specify the threshold (the Consolidation threshold 204) through the Management terminal 520. With the above described process, the risk to stored data and the problems such as reduction in reliability and performance across a large number of data objects can be effectively mitigated.

A.3. Read Process

Figure 10:
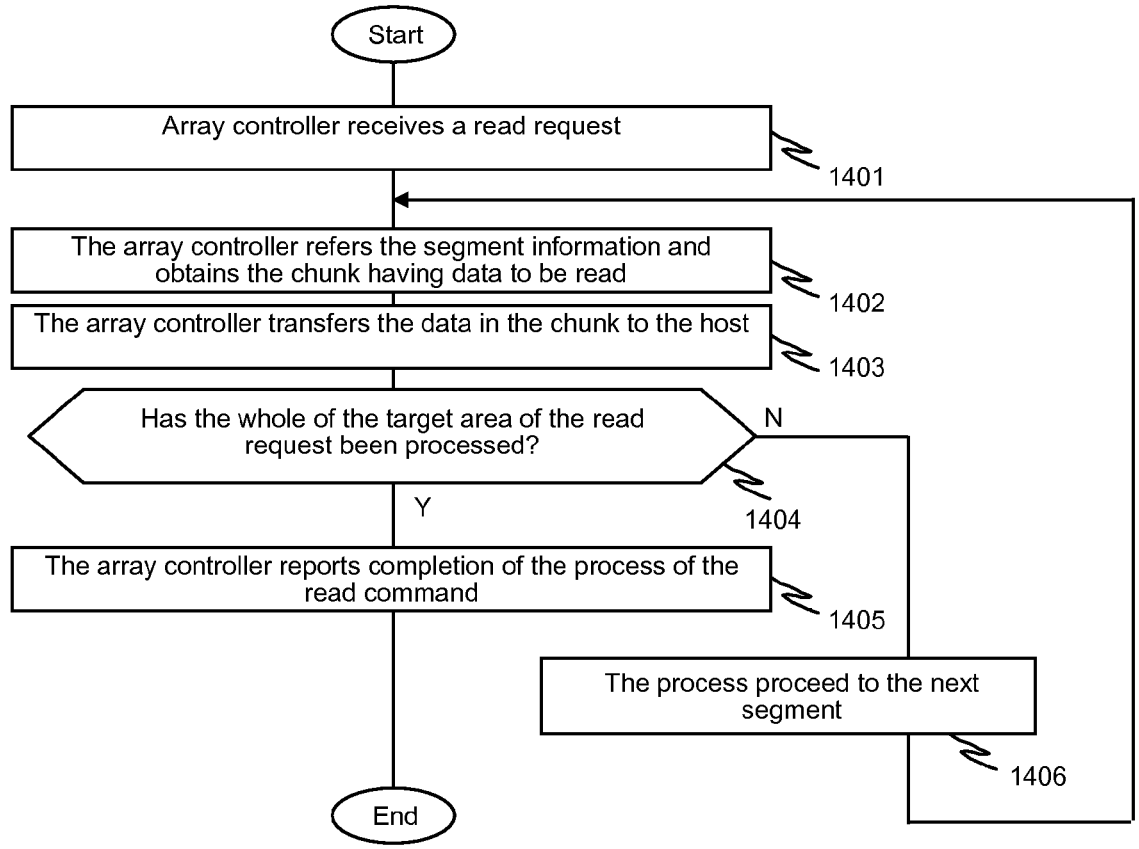
FIG. 10 illustrates an exemplary embodiment of a process for performing read request.

FIG. 10 illustrates an exemplary embodiment of a process for a read request.

At step 1401, the Array controller 110 receives a read request from the Host 500 via the SAN 901. The Array controller 100 designates the first segment of target area corresponding to the read request as the current target segment to be processed.

At step 1402, the Array controller 110 refers to the Segment information 203 and obtains the chunk for the target segment.

At step 1403, the Array controller 110 transfers the data in the chunk to the host. If the entire target area corresponding to the read request has been processed at step 1404, the Array controller 110 reports the completion of the process of the read request to the host (step 1405), and terminates the process. If not, the Array controller 110 designates the next segment as the target segment (step 1406), and then the process proceeds to step 1402.

A.4. First Example of Deduplication Process as a Post Process: Limitation of Deduplication Deduplication of data stored in Storage system 100 can be performed independently of the write process. That is, deduplication can be performed as a post process after storing the data. This process can be also performed for mirror/snapshot data after decoupling of the mirror.

Figure 11:
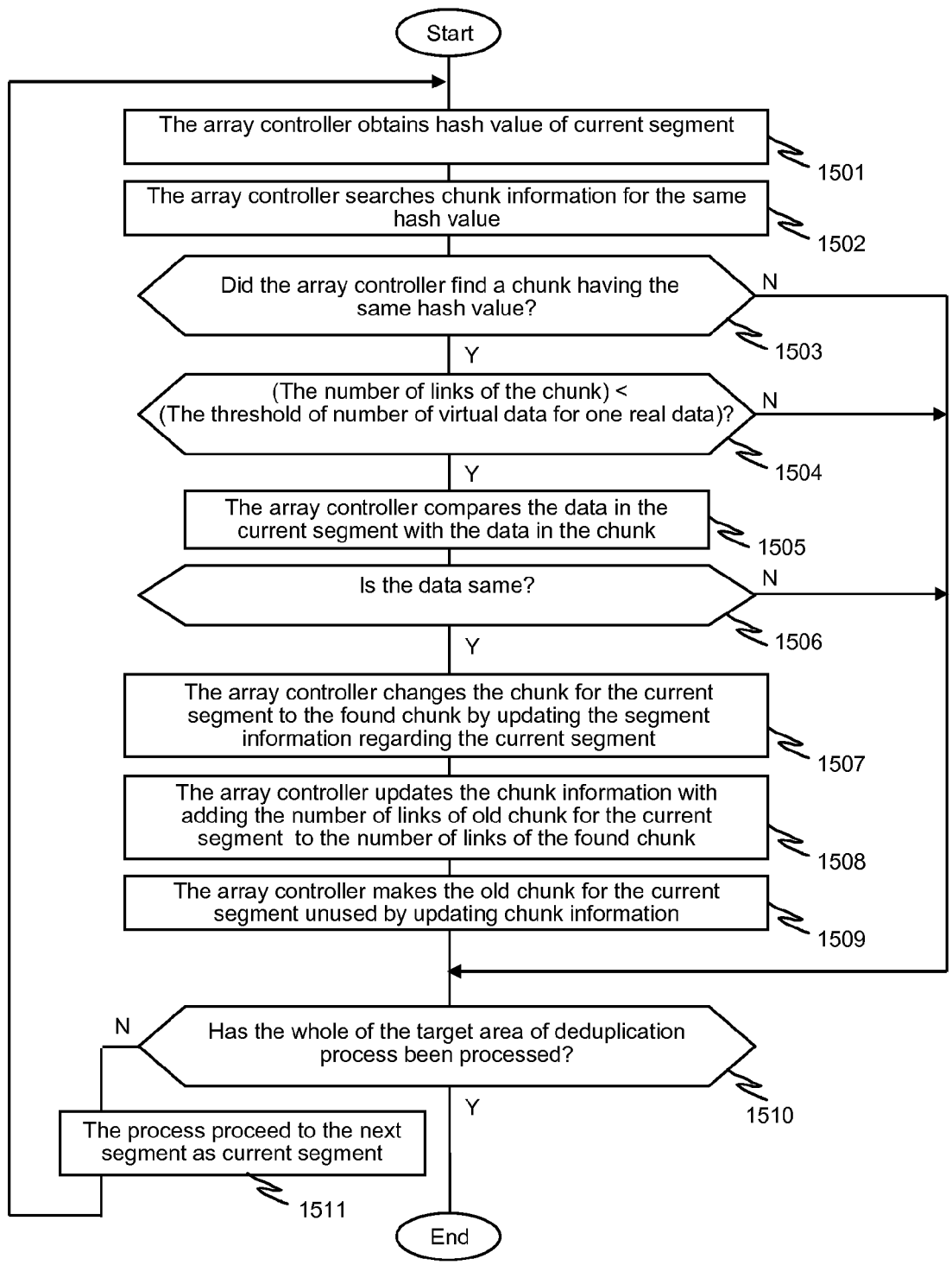
FIG. 11 illustrates an exemplary deduplication process as a post process.

FIG. 11 illustrates the deduplication process as post process.

At step 1501, the Array controller 110 calculates hash value of data stored in a chunk corresponding to the current segment using the hash function.

At step 1502, the Array controller 110 searches the Chunk information 202 for the same hash value.

At step 1503, if the Array controller 110 finds a chunk having the same hash value, the process proceeds to step 1504. If not, the process proceeds to step 1510.

At step 1504, the Array controller 110 compares the threshold value recorded in the Consolidation threshold record 204 with the number of links pointing to the chunk found in step 1503 by referring to the Consolidation threshold record 204 and the Chunk information 202. If the number of links is smaller than the threshold, the process proceeds to step 1505. If not, the process proceeds to step 1510.

At step 1505, the Array controller 110 compares the data in the current segment with the data in the found chunk using a binary-level comparison.

At step 1506, if, based on the comparison, it is determined that both data are the same, the process proceeds to step 1507. If not, the process proceeds to step 1510.

At step 1507, the Array controller 110 updates the Segment information 203 by changing the chunk for the current segment to the found chunk having the same data.

At step 1508, the Array controller 110 updates the Chunk information 202 by adding the number of links of the old chunk for the current segment to the number of links of the found chunk having the same data.

At step 1509, the Array controller 110 updates the Chunk information 202 by labeling the old chunk unused.

If the whole of the target area of the deduplication process has been processed at step 1510, the process terminates. If not, the Array controller 110 designates the next segment as the current segment (step 1511), and after that the process proceeds to step 1501.

Also in the above deduplication process, if the number of links pointing to a chunk reaches the deduplication threshold, the consolidation of same data (i.e. deduplication) is not performed. Using the above inventive process, the risk to stored data and the problems such as reduction of reliability and performance across a large number of deduplicated data objects can be mitigated.

Figure 12:
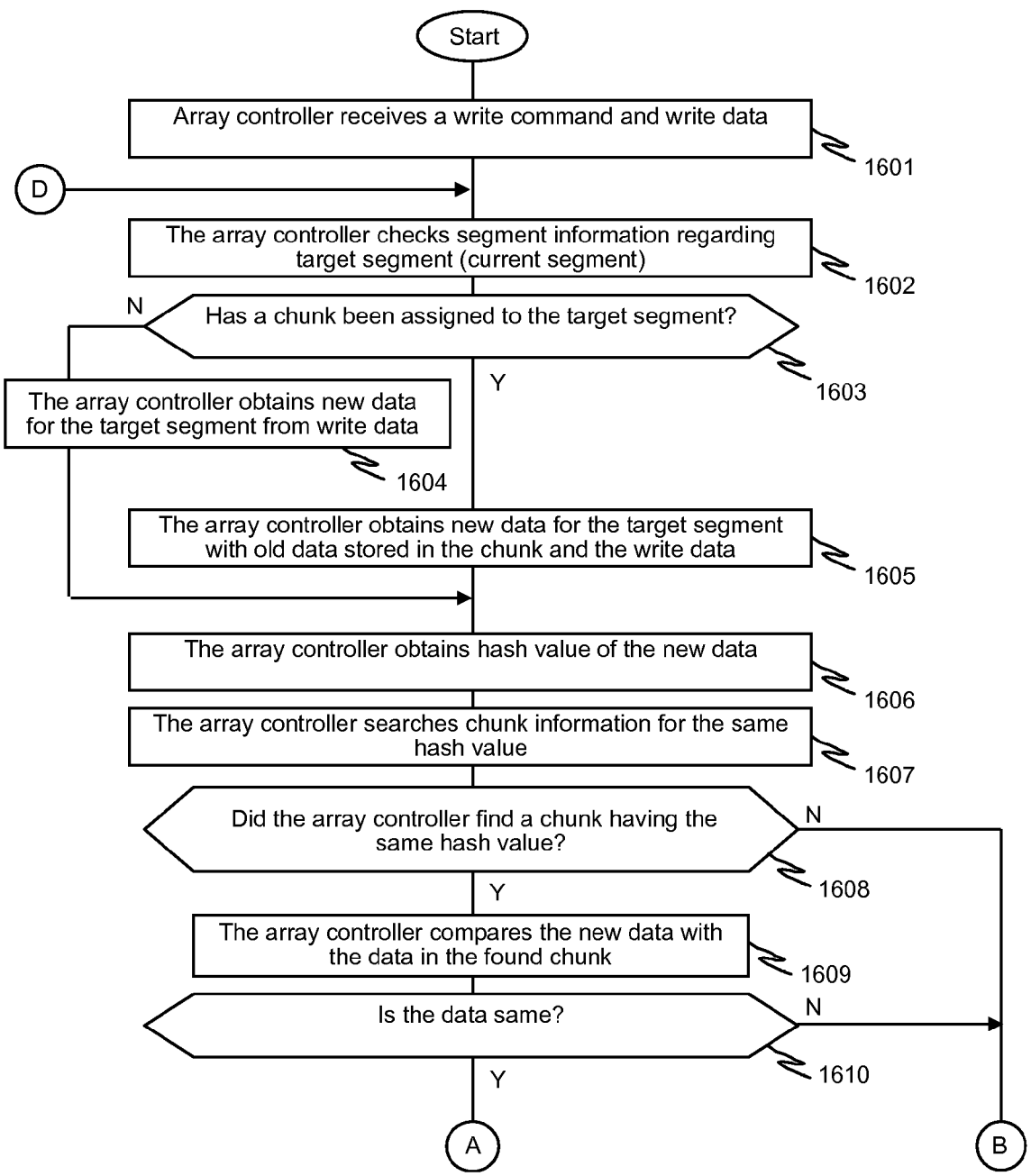
FIG. 12 illustrates the first part of an exemplary embodiment of the write process.
Figure 13:
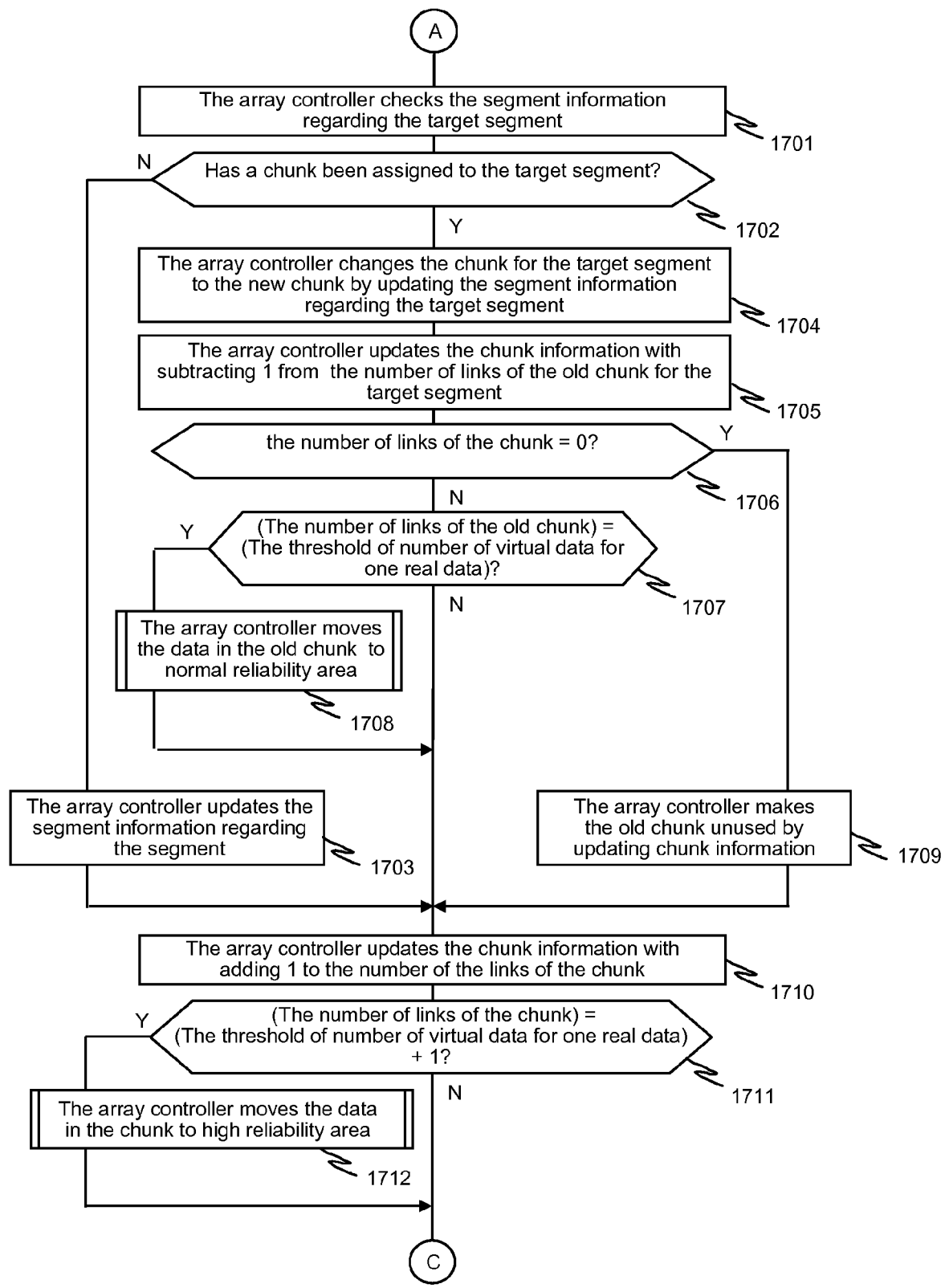
FIG. 13 illustrates the second part of an exemplary embodiment of the write process.
Figure 14:
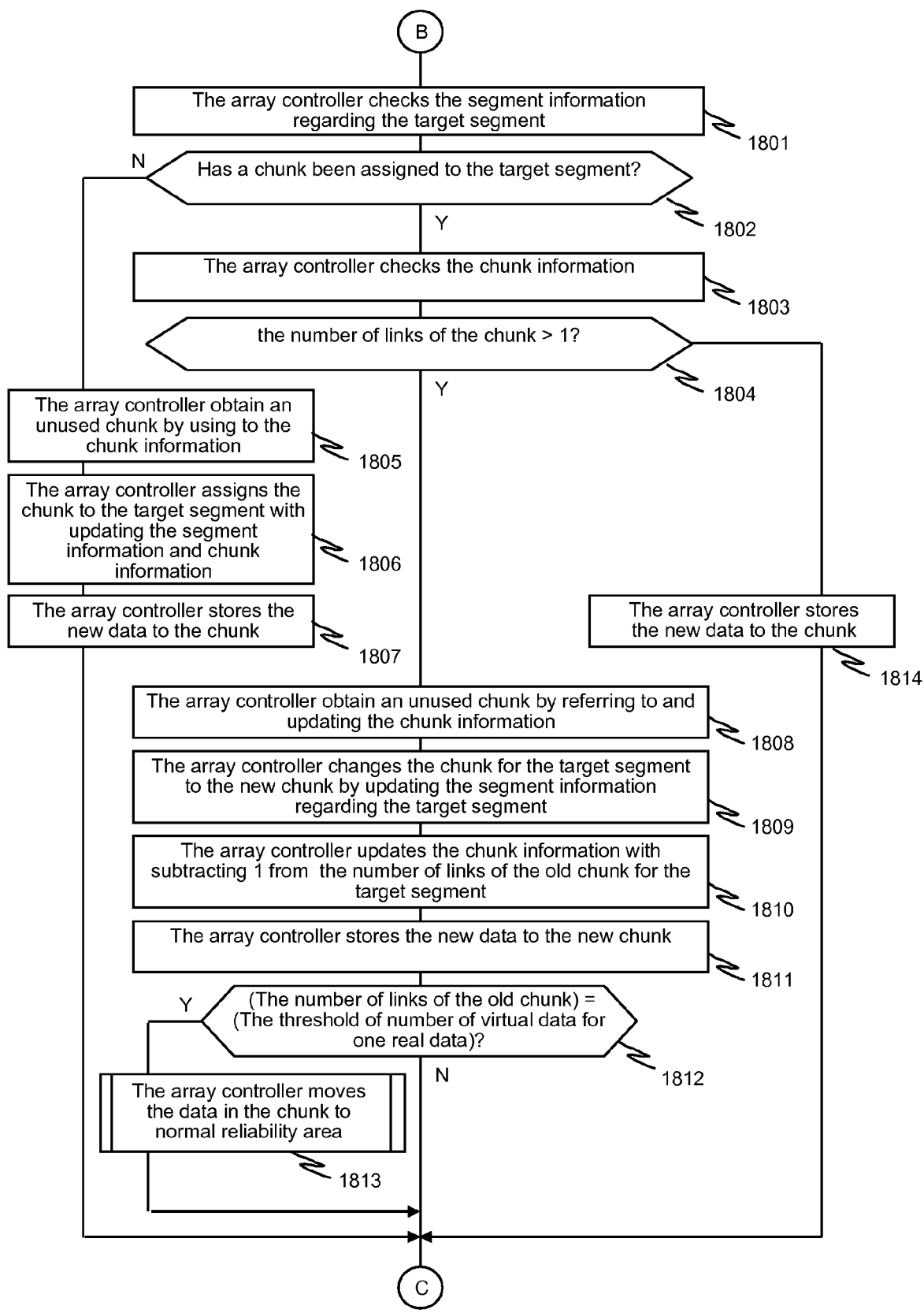
FIG. 14 illustrates the third part of an exemplary embodiment of write process.

A.5. Second Example of Write Process: Data Migration Based on the Number of Links FIG. 12, FIG. 13 and FIG. 14 illustrate another example of a write process with deduplication. With the shown process, data migration between areas of different reliability is performed based on the comparison between the threshold and the number of links pointing to a chunk after deduplication.

FIG. 12 illustrates the first part of the exemplary write process. In this part, the detection of duplication is performed. The process is the same as the process described in FIG. 6 except for that the step 1009 has been eliminated.

FIG. 13 describes the second part of the write process. In this part, a link (relation) is created or updated instead of physically storing the data. This process is the same as the process described the FIG. 7 except for the addition of the following procedure after the addition/subtraction step for the number of links: (i) comparison between the number of links and the threshold and (ii) data migration between areas of different reliability based on the result of the comparison. The related steps are the following.

If the number of links of the old chunk equals to the threshold at step 1707, the Array controller 110 moves the data in the old chunk from high reliability area such as RAID6 to normal reliability area such as RAID1 or RAID5 (step 1708). The threshold is recorded in the Consolidation threshold record 204 and indicates a threshold with respect to the number of virtual data objects for one physical data object. In other words, this threshold indicates a threshold with respect to the degree of deduplication.

If the number of links pointing to the chunk equals to the threshold plus 1 at step 1711, the Array controller 110 moves the data in the chunk from the normal reliability area such as RAID1 and RAID5 to the high reliability area such as RAID6 (step 1712).

FIG. 14 illustrates the third part of the write process. In this part, the data is physically written to a storage device. This process is the same as the corresponding process described the FIG. 8, except for the addition of following procedure after the subtraction operation with respect to the number of links: (i) comparison between the number of links and the threshold and (ii) data migration between areas of different reliability based on the result of the comparison. The related steps are the following.

If the number of links pointing to the old chunk equals to the threshold at step 1812, the Array controller 110 moves the data in the old chunk from the high reliability area such as RAID6 to the normal reliability area such as RAID1 or RAID5 (step 1813).

In the above process, if the number of links pointing to a chunk exceeds the deduplication threshold, the data in the chunk is migrated to the high reliability area such as RAID6. Using the above inventive process, the risk of loss to the stored data and the problems such as reduction of reliability and performance across a large number of data objects can be mitigated.

Figures 15, 16:
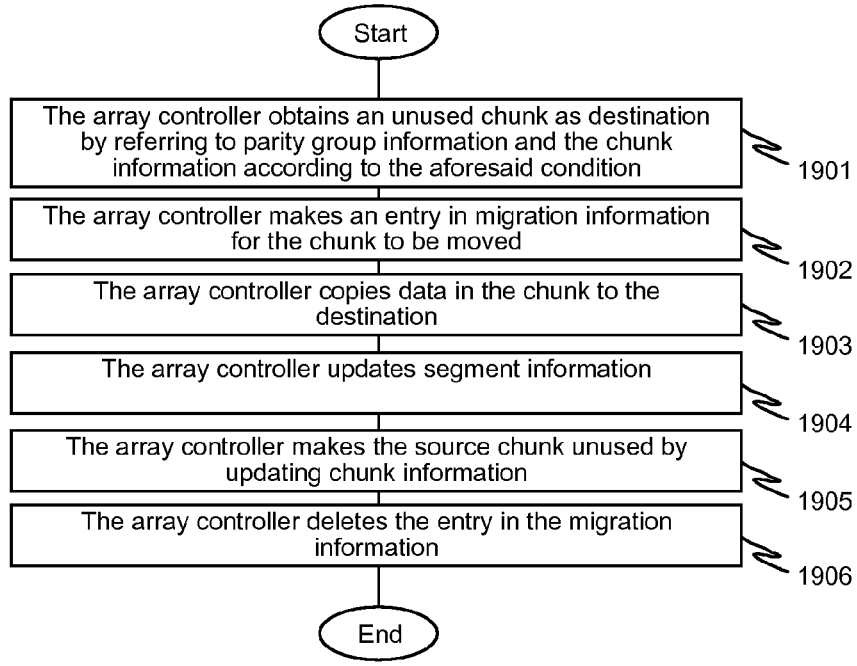
FIG. 15 illustrates an exemplary migration process.
FIG. 16 illustrates an exemplary embodiment of Migration information.

FIG. 15 illustrates the migration process mentioned above.

At step 1901, the Array controller 110 seeks an unused chunk by referring to the Parity group information 201 and the Chunk information 202. The unused chunk is obtained from high reliability area (e.g. RAID6) or normal reliability area (e.g. RAID1 or RAID5) according to the condition mentioned in the aforesaid processes.

At step 1902, the Array controller 110 creates an entry in Migration information 205 for the chunk to be moved. FIG. 16 shows an exemplary embodiment of the Migration information 205. Migration information 205 has sets of parity group ID information and Chunk ID information for both of the source and the destination. It also has a copy pointer that denotes the progress of the copy operation.

At step 1903, the Array controller 110 copies the data in the source chunk to the chunk selected as the destination. According to progress of the copying operation, the copy pointer in Migration information 206 is updated by moving it forward.

At step 1904, after the completion of the copying operation, the Array controller 110 updates the Segment information 203 to change chunk for the related segment(s) from the source chunk to the destination chunk. In other words, the Array controller 110 changes mapping between the segment(s) and the chunk. This accomplishes the transparent migration of the data for Host 500.

At step 1905, the Array controller 110 updates the Chunk information 202 to label the source chunk as unused.

At step 1906, the Array controller 110 deletes the entry for the chunk.

A.6. Second Example of Deduplication Process as a Post Process: Data Migration Based on the Number of Links FIG. 17 describes illustrates another example of the deduplication process as a post process. With this process, data migration between areas of different reliability is performed based on comparison between the threshold and the number of links pointing to a chunk after the deduplication.

Figure 17:
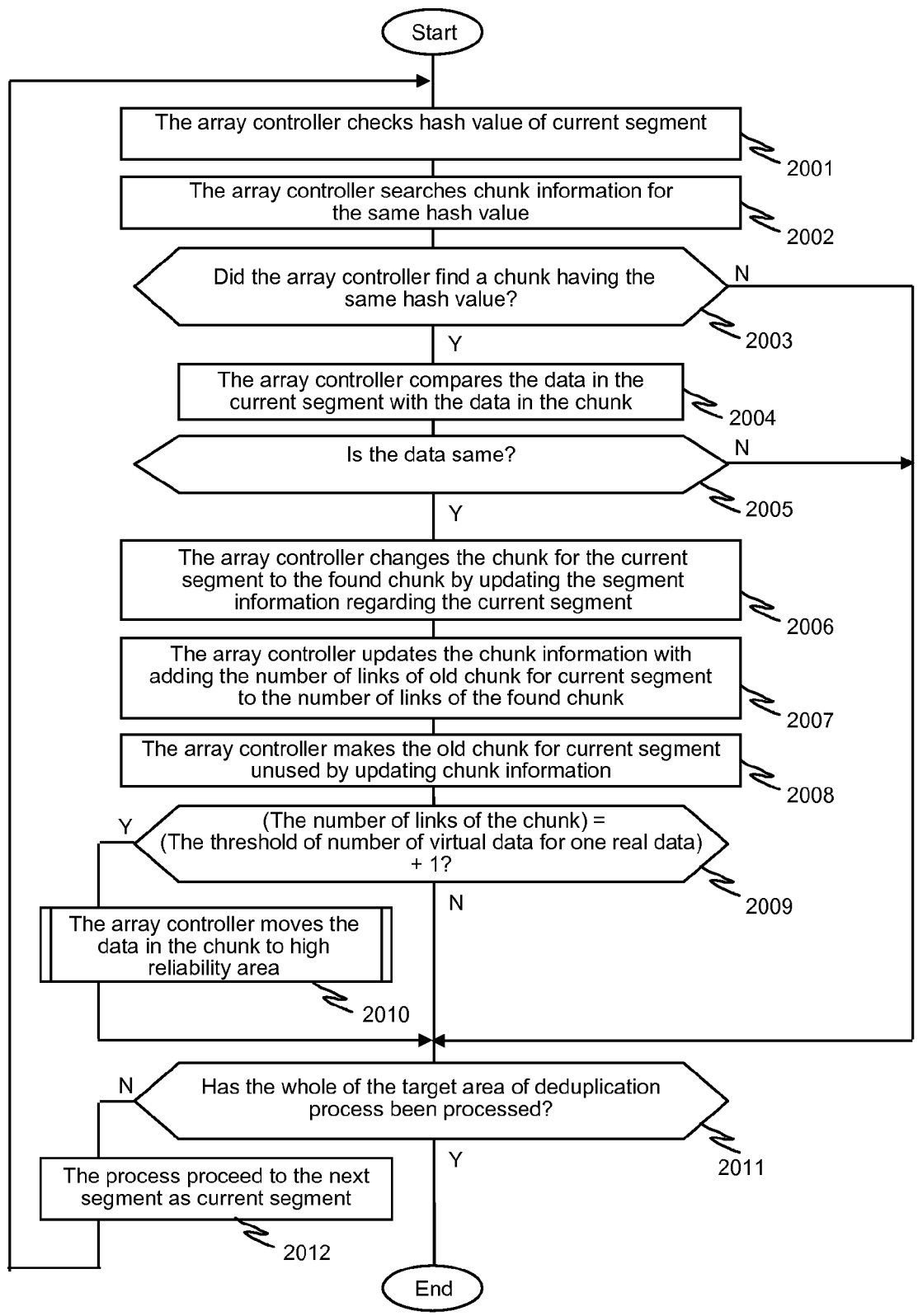
FIG. 17 describes another example of deduplication process as a post process.

The process shown in FIG. 17 is the same as the corresponding process described the FIG. 11, except for deletion of the step 1504 and addition of following procedure, which is performed after the addition operation performed on the number of links: (i) comparison between the number of links and the threshold and (ii) data migration between areas of different reliability based on the result of the comparison. The related steps are the following.

If the number of links pointing to the chunk equals to the threshold plus 1 at step 2009, the Array controller 110 moves the data in the chunk from the normal reliability area such as RAID1 and RAID5 to the high reliability area such as RAID6 (step 2010).

Also in the above deduplication process, if the number of links pointing to a chunk exceeds the deduplication threshold, the data in the chunk is migrated to the high reliability area such as RAID6. Using the above inventive process, the risk of loss to the stored data and the problems such as reduction of reliability and performance across a large number of data objects can be mitigated.

B. Second Embodiment

B.1. System Configuration

Figure 18:
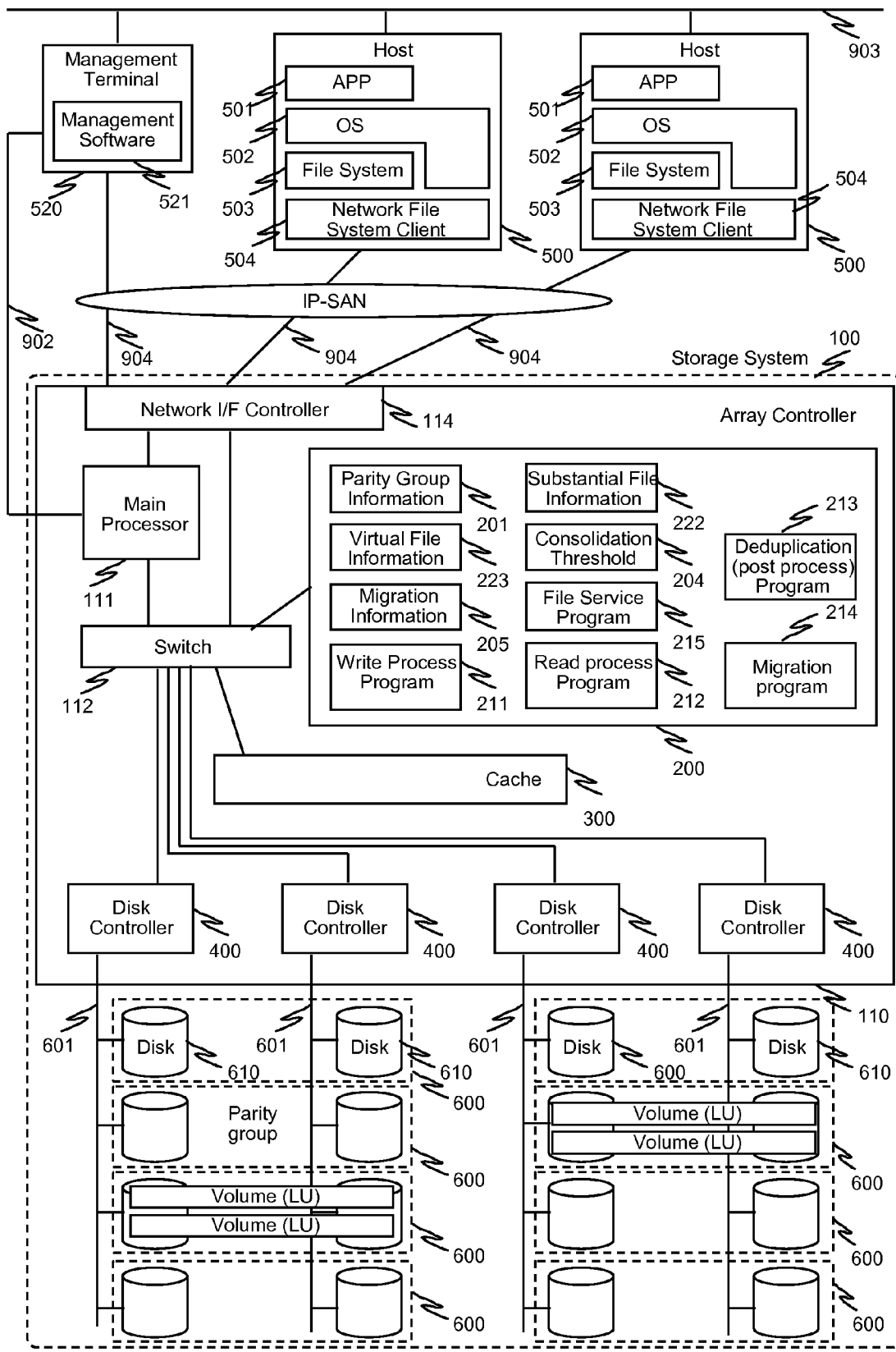
FIG. 18 illustrates an exemplary system configuration of the second embodiment.

FIG. 18 illustrates an exemplary system configuration of the second embodiment. In the system of the second embodiment, the Array controller 110 incorporates a Network I/F controller 114 instead of the Block interface controller 113 of the first embodiment. The Memory 200 maintains a Substantial file information 222 and a Virtual file information 223 instead of the Chunk information 202 and the Segment information 203 of the first embodiment.

In addition to the programs mentioned in the first embodiment, the Memory 200 contains a File service program 215. The File service program 215 exports files (i.e. it makes files accessible) via network file sharing protocols such as NFS (Network File System) and CIFS (Common Internet File System). Moreover, the File service program 215 interprets requests from the Host 500 and handles those requests by invoking the Write process program 211 and the Read process program 212. The addition of the Network I/F controller 114 and the File service program 215 enables the Storage system 100 to function as a NAS (Network Attached Storage) system.

The Host 500 and the Management terminal 520 are connected to the Network interface 114 via an IP-SAN 904 (i.e. IP network). In addition to the configuration mentioned in the first embodiment, the Host 500 incorporates a Network file system client software 504. The Network file system client 504 sends the Storage system 100 file I/O requests via IP-SAN 904 using network file sharing protocols such as NFS and CIFS in response to an instruction from the Application software 501 and the like. Other components of the system of the second embodiment are generally the same as the respective components described with reference to the first embodiment.

Figure 19:
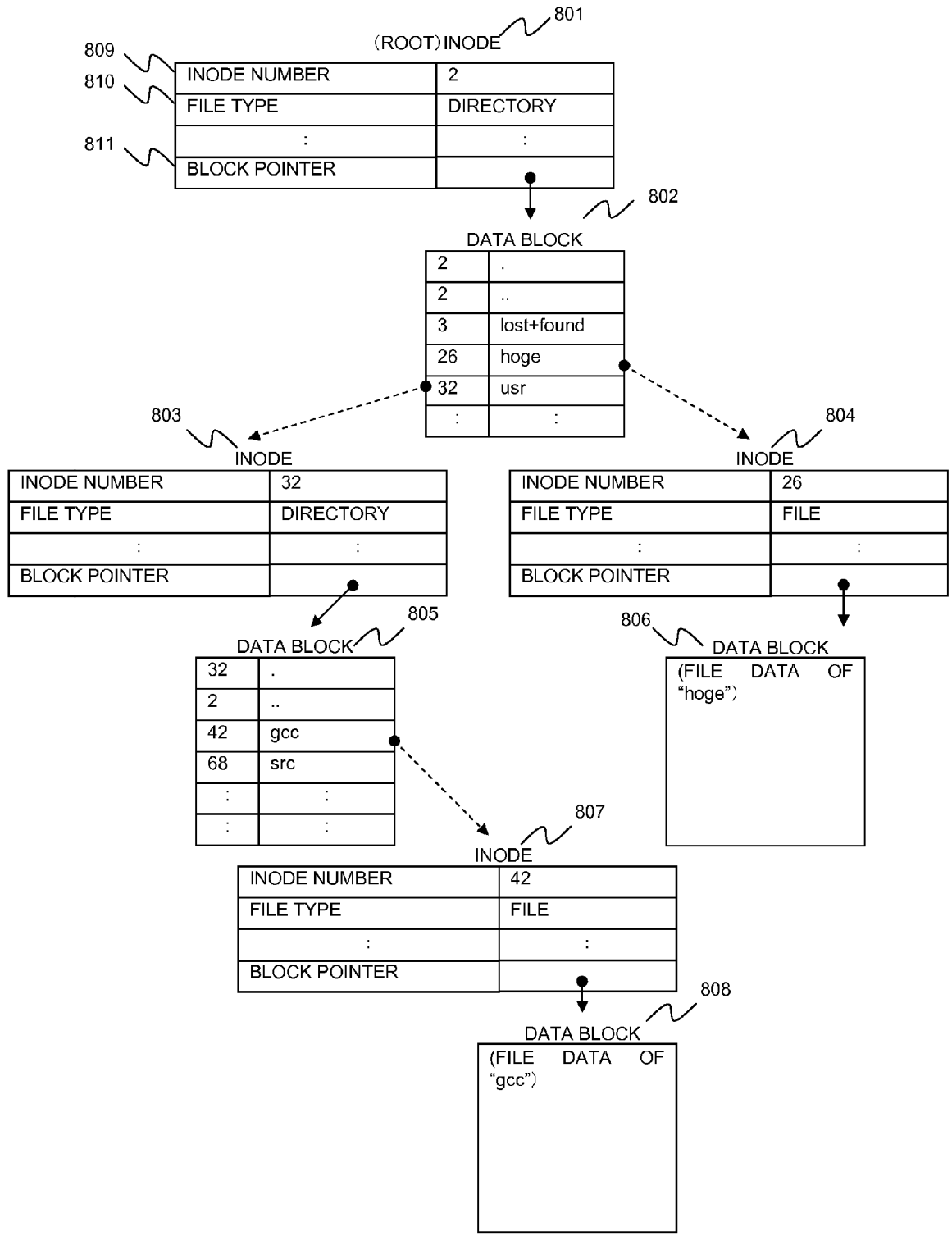
FIG. 19 illustrates an exemplary embodiment of file system data structure.

FIG. 19 illustrates an exemplary embodiment of the file system data structure. Each mode can be used to indicate a file or a directory. If the mode indicates a file (if its File Type field is "file" such as 804 and 807), the Data Blocks pointed from Block Pointer in the mode contain actual data of the file. If a file is stored in a plurality of Data Blocks (e.g. 10 blocks), the addresses of the 10 Data Blocks are recorded in Block Pointer. If the mode indicates a directory (if the File Type field is "directory" such as 801 and 803), the Data Blocks pointed from Block Pointer in the mode stores the list of Inode Numbers and names of all files and directories that resides in the directory (the list is called Directory Entry). The aforesaid several types of information used to manage files are stored in volumes in the Storage system 100 according to a predetermined placement rule.

Figure 20:
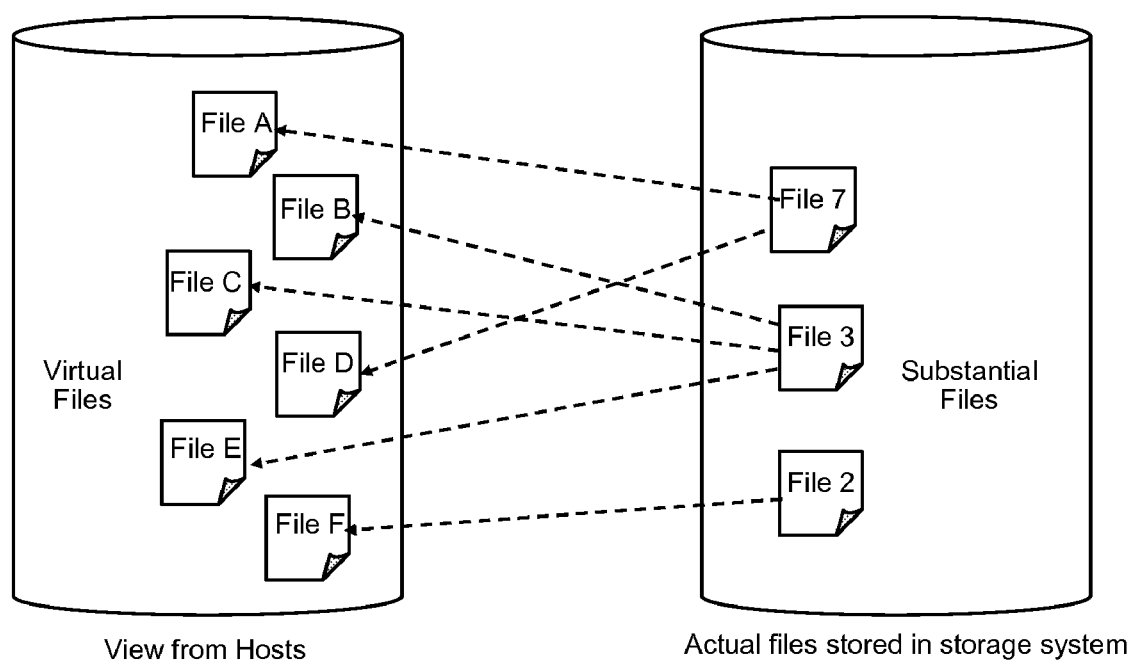
FIG. 20 illustrates usage of actual storage area in Storage system.

FIG. 20 illustrates usage of physical storage area in the Storage system 100. The Storage system 100 stores files used by the Hosts 500 and continues to present (export) these files to the Hosts 500. In addition, the Storage system 100 performs deduplication for the files if the Storage system 100 detects files having the same content. As shown in FIG. 20, the Storage system 100 provides virtual files to the Host 500 and the virtual files are linked to the physical files that are physically stored in storage area of the Storage system 100. This relation between the virtual files and the physical files is similar to the relation between the segments and chunks mentioned with respect to the first embodiment.

The above relationship (link) and the related information are expressed by Substantial file information 222 and Virtual file information 223 shown in FIG. 21 and FIG. 22. The substantial file information 222 is information necessary to manage substantial (physical) file physically stored in the Storage system 100. In FIG. 21, the Substantial file information 222 includes a substantial file ID identifying each substantial file, a hash value generated from the content of the substantial file and the number of links pointing to the substantial file. The number of links represents the number of relationships between the substantial file and virtual files shown in FIG. 20.

The virtual file information 223 is information necessary to manage virtual files provided to the Host 500. In FIG. 22, the Virtual file information 223 includes a virtual file ID identifying each virtual file and a substantial file ID of the linked substantial file. In this embodiment, the virtual file ID and the substantial file ID are independent.

B.2. Deduplication Process

Figure 23:
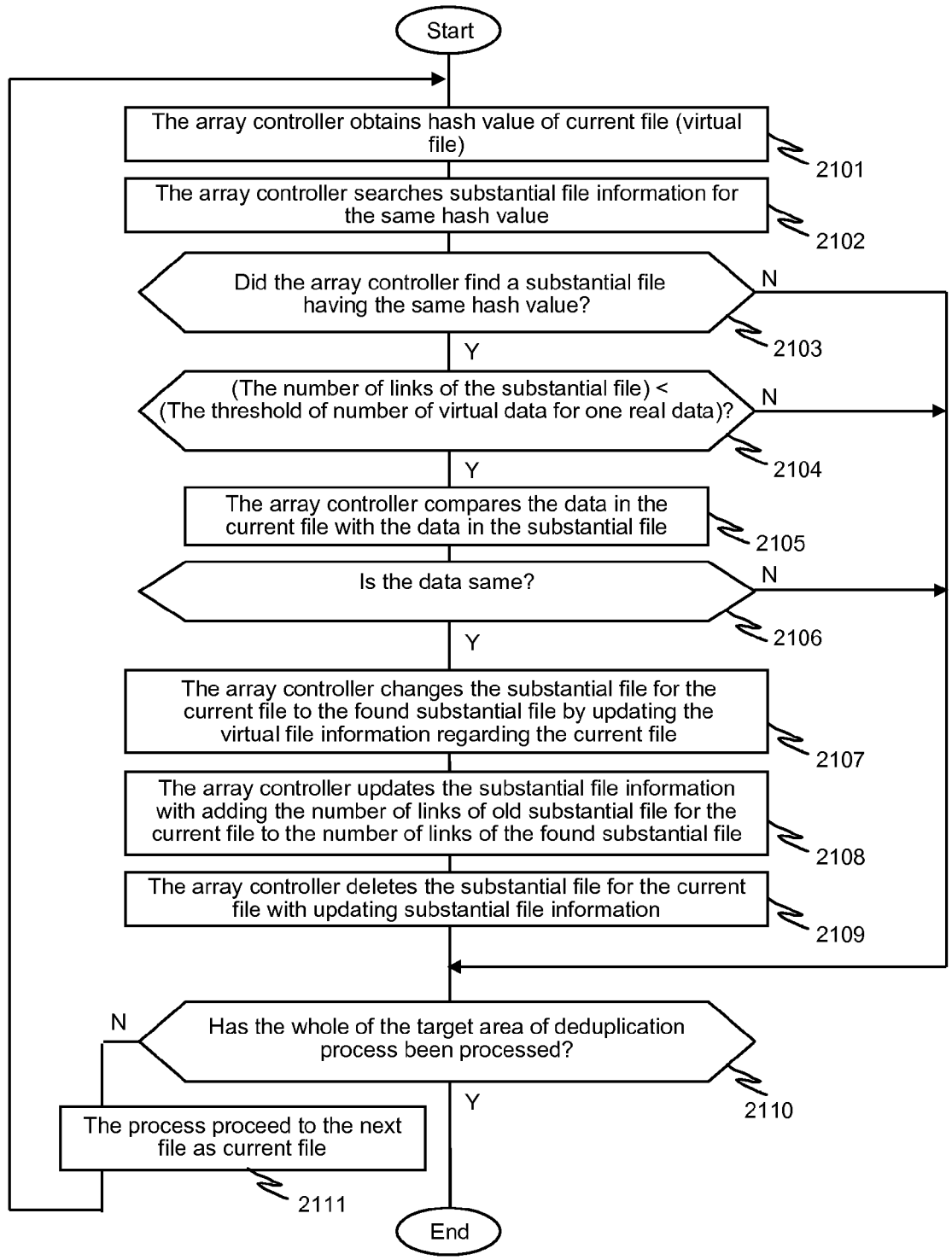
FIG. 23 illustrates one example of the deduplication process as post process.

The deduplication processes such as the write deduplication process and deduplication process performed as a post process can be performed in the same manner as described with reference to the first embodiment. FIG. 23 illustrates one example of the deduplication process performed as a post process in this embodiment.

At step 2101, the Array controller 110 calculates the hash value of the data in current file (virtual file) using the hash function.

At step 2102, the Array controller 110 searches the Substantial file information 222 for the same hash value.

At step 2103, if the Array controller 110 can find a substantial file having the same hash value, the process proceeds to step 2104. If not, the process proceeds to step 2110.

At step 2104, the Array controller 110 compares the threshold value recorded in Consolidation threshold record 204 with the number of links of the substantial file found in step 2103 by referring to the Consolidation threshold record 204 and the Substantial file information 222. The consolidation threshold indicates a threshold with respect to the number of virtual data files for one substantial (physical) data file. In other words, this threshold represents a threshold with respect to the degree of deduplication. If the number of links is smaller than the threshold, the process proceeds to step 2105. If not, the process proceeds to step 2110.

At step 2105, the Array controller 110 compares the data in the current virtual file with data in the found substantial file by binary-level comparison.

At step 2106, as result of the comparison, if the both data are same, the process proceeds to step 2107. If not, the process proceeds to step 2110.

At step 2107, the Array controller 110 updates the Virtual file information 223 by changing the substantial file for the current virtual file to the found substantial file having the same data.

At step 2108, the Array controller 110 updates the Substantial file information 222 by adding the number of links pointing to the old substantial file associated with the current file to the number of links of the found substantial file having the same data.

At step 2109, the Array controller 100 deletes the substantial file associated with the current file by updating the Substantial file information 222. If all the target files of the deduplication process have been processed at step 2110, the process terminates. If not, the Array controller 110 designates the next file as the current file (step 2111), and the process proceeds to step 2101.

In the above deduplication process, if the number of links pointing to the substantial file reaches the deduplication threshold, consolidation of the same data (i.e. deduplication) is not performed. Using the above inventive process, the risk of loss to the stored data and the problems such as reduction of reliability and performance across a large number of data objects can be mitigated.

Just like the above-described process, by considering chunk and segment in the first embodiment as substantial file and virtual file in this embodiment, each process mentioned with reference to the first embodiment can be applied to the file storage system (Storage system 100) in the second embodiment. The Chunk information 201 and the Segment information 203 in the first embodiment correspond to each of the Substantial file information 222 and the Virtual file information 223 in this embodiment. Obtaining and releasing (making unused) chunks also corresponds to creation and delectation of substantial files. As another example of high reliability area, storage area in which data is protected by remote replication to other storage system can be applied.

By applying the processes such as the write process deduplication or the deduplication process performed as a post process, as described hereinabove, the risk of loss to the stored data and the problems such as reduction of reliability and performance across a large number of data objects in network file storage systems (NAS) having deduplication capability can be successfully mitigated.

C. Third Embodiment

C.1. System Configuration

Figure 24:
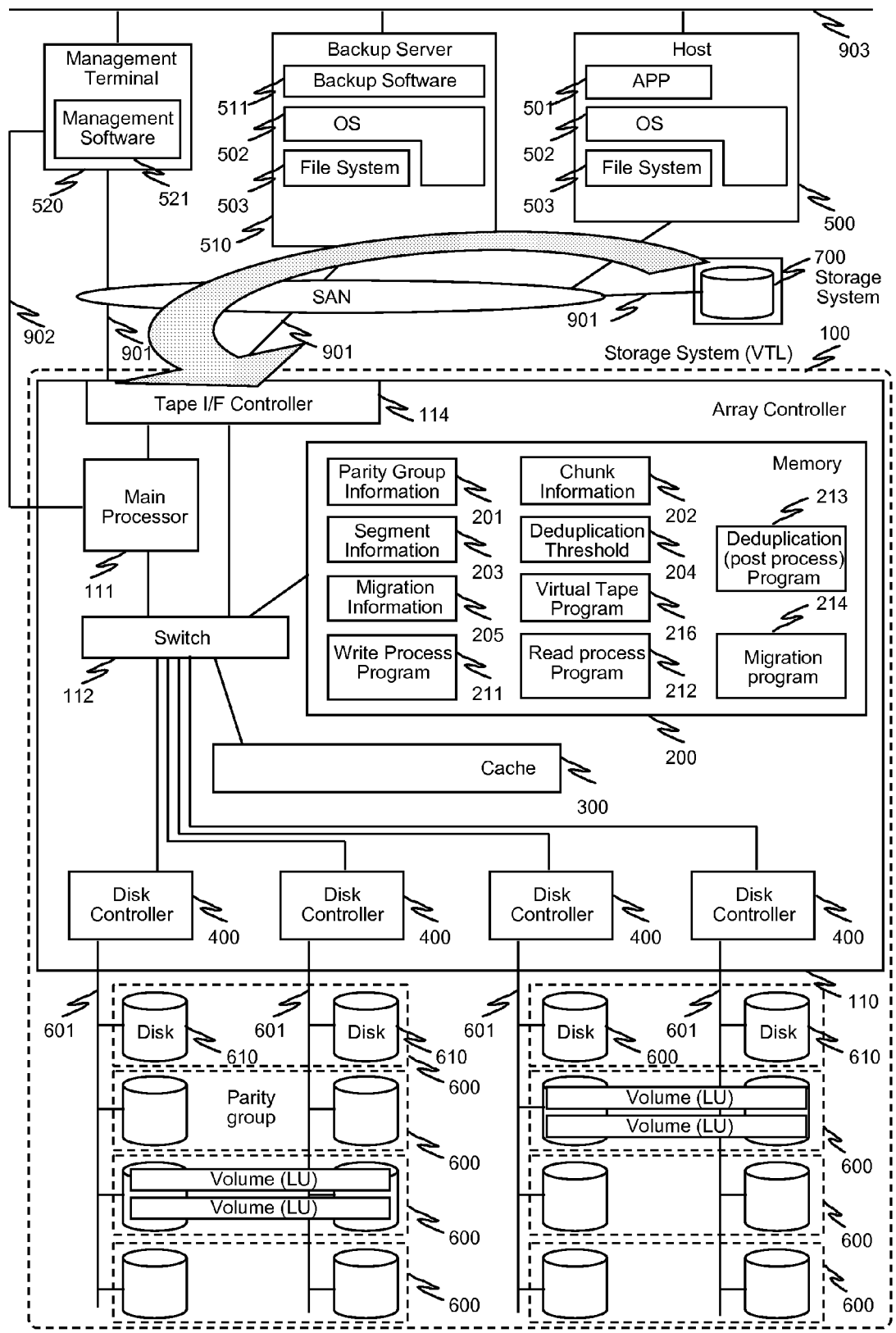
FIG. 24 illustrates an exemplary system configuration of the third embodiment.

FIG. 24 illustrates an exemplary system configuration of the third embodiment. In addition to components mentioned with reference to the first embodiment, the system in this embodiment incorporates a Backup server 510 and Storage system 700. The Backup server 510 incorporates the Backup software 511. The Host 500 and the Storage system 700 are connected by a SAN 901, which enables the Host 500 to store data the Storage system 700. Array controller 110 incorporates a Tape (stream) interface controller 114 instead of the Block interface controller 113 of the first embodiment. In addition to the programs mentioned in the first embodiment, the Memory 200 contains a Virtual tape program 216.

The Virtual tape program 216 emulates a tape device and a tape library. That is, it interprets requests for a tape device from the Host 500 and handles these requests by invoking the Write process program 211 and the Read process program 212. The Backup server 510 and the Host 500 can use the Storage system 100 as a tape library with a tape media. This enables the Storage system 100 to function as a VTL (Virtual Tape Library). The other components of the system of the third embodiment are generally the same as the corresponding components described with reference with the first embodiment.

C.2. Deduplication Process in Backup Operation

In the backup operation, the Backup software 511 reads data used by the Host 500 from the Storage system 700 and writes the data to the Storage system 100. In the restore operation, the Backup software 511 reads the data to be restored from the Storage system 100 and writes it to the Storage system 700.

Because the processes in the Storage system 100 are same as the corresponding process mentioned with reference to the first embodiment, except for virtual tape function including interpreting and converting of requests, each deduplication-related process mentioned with reference to the first embodiment can be applied to the Storage system 100 in the third embodiment.

By applying the processes such as write deduplication process or deduplication process performed as a post process described above, the risk of loss to the stored data and the problems such as reduction of reliability and performance across a large number of data objects in VTL having deduplication capability can be successfully mitigated. In another exemplary storage system configuration, the controller having the deduplication capability can be separated, for example as an appliance, from the rest of the storage system having HDDs.

D. Fourth Embodiment

Figure 25:
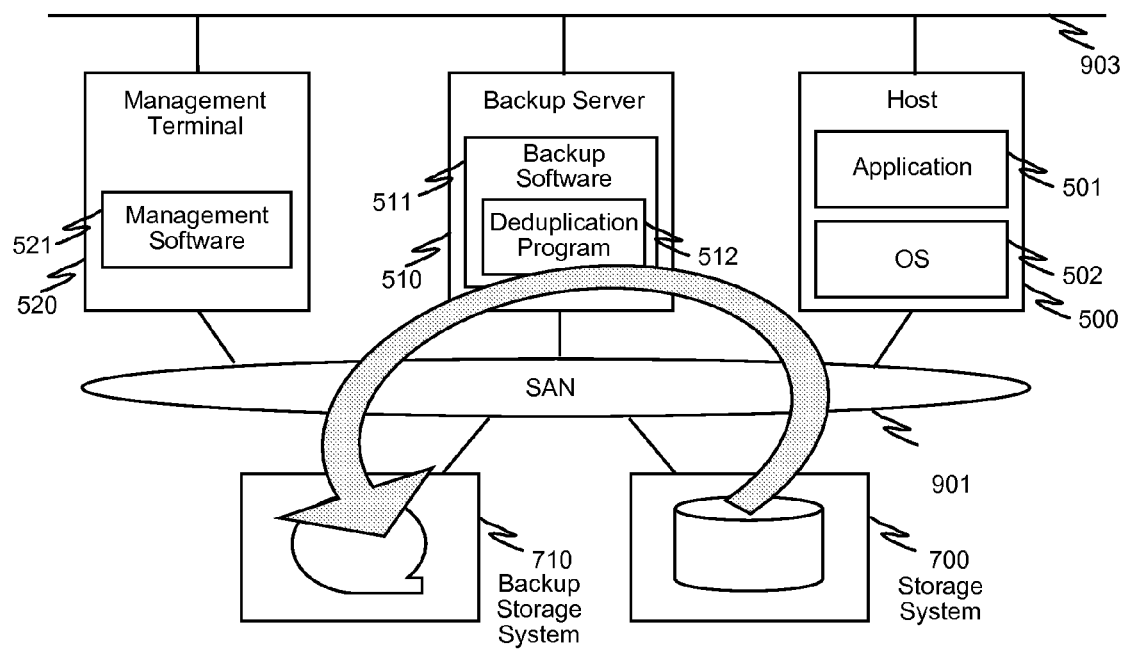
FIG. 25 illustrates an exemplary system configuration of the fourth embodiment.

FIG. 25 illustrates an exemplary system configuration of the fourth embodiment. In this embodiment, the Backup software 511 incorporates a Deduplication program 512 in order to provide the functions and capability with respect to deduplication mentioned in the above embodiments. During the backup operation, the Backup software 511 reads data used by the Host 500 from the Storage system 700 and writes the data to the Backup storage system 710, such as a tape device.

During the restore operation, the Backup software 511 reads the data to be restored from the Backup storage system 710 and writes the data to the Storage system 700.

By applying the processes such as the write deduplication process or deduplication process performed as a post process described above to processes performed by the Backup software 511, the risk of loss to the backup data and the problems such as reduction of reliability and performance across a large number of backup data objects can be successfully mitigated.

E. Exemplary Computer Platform

Figure 26:
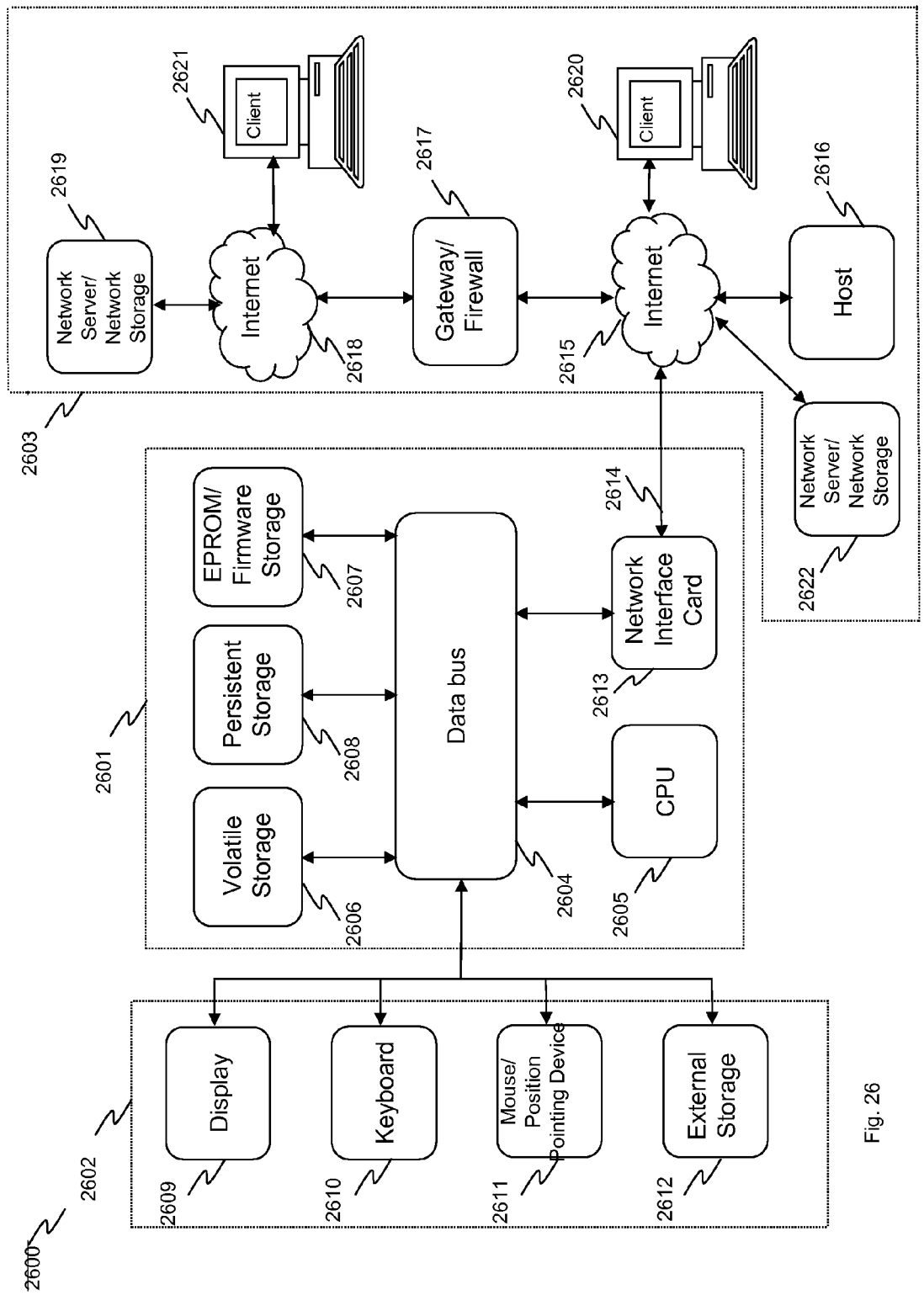
FIG. 26 illustrates an exemplary embodiment of a computer platform upon which the inventive system may be implemented.

FIG. 26 is a block diagram that illustrates an embodiment of a computer/server system 2600 upon which an embodiment of the inventive methodology may be implemented. The system 2600 includes a computer/server platform 2601, peripheral devices 2602 and network resources 2603.

The computer platform 2601 may include a data bus 2604 or other communication mechanism for communicating information across and among various parts of the computer platform 2601, and a processor 2605 coupled with bus 2601 for processing information and performing other computational and control tasks. Computer platform 2601 also includes a volatile storage 2606, such as a random access memory (RAM) or other dynamic storage device, coupled to bus 2604 for storing various information as well as instructions to be executed by processor 2605. The volatile storage 2606 also may be used for storing temporary variables or other intermediate information during execution of instructions by processor 2605. Computer platform 2601 may further include a read only memory (ROM or EPROM) 2607 or other static storage device coupled to bus 2604 for storing static information and instructions for processor 2605, such as basic input-output system (BIOS), as well as various system configuration parameters. A persistent storage device 2608, such as a magnetic disk, optical disk, or solid-state flash memory device is provided and coupled to bus 2601 for storing information and instructions.

Computer platform 2601 may be coupled via bus 2604 to a display 2609, such as a cathode ray tube (CRT), plasma display, or a liquid crystal display (LCD), for displaying information to a system administrator or user of the computer platform 2601. An input device 2610, including alphanumeric and other keys, is coupled to bus 2601 for communicating information and command selections to processor 2605. Another type of user input device is cursor control device 2611, such as a mouse, a trackball, or cursor direction keys for communicating direction information and command selections to processor 2604 and for controlling cursor movement on display 2609. This input device typically has two degrees of freedom in two axes, a first axis (e.g., x) and a second axis (e.g., y), that allows the device to specify positions in a plane.

An external storage device 2612 may be connected to the computer platform 2601 via bus 2604 to provide an extra or removable storage capacity for the computer platform 2601. In an embodiment of the computer system 2600, the external removable storage device 2612 may be used to facilitate exchange of data with other computer systems.

The invention is related to the use of computer system 2600 for implementing the techniques described herein. In an embodiment, the inventive system may reside on a machine such as computer platform 2601. According to one embodiment of the invention, the techniques described herein are performed by computer system 2600 in response to processor 2605 executing one or more sequences of one or more instructions contained in the volatile memory 2606. Such instructions may be read into volatile memory 2606 from another computer-readable medium, such as persistent storage device 2608. Execution of the sequences of instructions contained in the volatile memory 2606 causes processor 2605 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2605 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 2608. Volatile media includes dynamic memory, such as volatile storage 2606. Transmission media includes coaxial cables, copper wire and fiber optics, including the wires that comprise data bus 2604. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 2605 for execution. For example, the instructions may initially be carried on a magnetic disk from a remote computer. Alternatively, a remote computer can load the instructions into its dynamic memory and send the instructions over a telephone line using a modem. A modem local to computer system 2600 can receive the data on the telephone line and use an infra-red transmitter to convert the data to an infra-red signal. An infra-red detector can receive the data carried in the infra-red signal and appropriate circuitry can place the data on the data bus 2604. The bus 2604 carries the data to the volatile storage 2606, from which processor 2605 retrieves and executes the instructions. The instructions received by the volatile memory 2606 may optionally be stored on persistent storage device 2608 either before or after execution by processor 2605. The instructions may also be downloaded into the computer platform 2601 via Internet using a variety of network data communication protocols well known in the art.

The computer platform 2601 also includes a communication interface, such as network interface card 2613 coupled to the data bus 2604. Communication interface 2613 provides a two-way data communication coupling to a network link 2614 that is connected to a local network 2615. For example, communication interface 2613 may be an integrated services digital network (ISDN) card or a modem to provide a data communication connection to a corresponding type of telephone line. As another example, communication interface 2613 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 2613 sends and receives electrical, electromagnetic or optical signals that carry digital data streams representing various types of information.

Network link 2613 typically provides data communication through one or more networks to other network resources. For example, network link 2614 may provide a connection through local network 2615 to a host computer 2616, or a network storage/server 2617. Additionally or alternatively, the network link 2613 may connect through gateway/firewall 2617 to the wide-area or global network 2618, such as an Internet. Thus, the computer platform 2601 can access network resources located anywhere on the Internet 2618, such as a remote network storage/server 2619. On the other hand, the computer platform 2601 may also be accessed by clients located anywhere on the local area network 2615 and/or the Internet 2618. The network clients 2620 and 2621 may themselves be implemented based on the computer platform similar to the platform 2601.

Local network 2615 and the Internet 2618 both use electrical, electromagnetic or optical signals that carry digital data streams. The signals through the various networks and the signals on network link 2614 and through communication interface 2613, which carry the digital data to and from computer platform 2601, are exemplary forms of carrier waves transporting the information.

Computer platform 2601 can send messages and receive data, including program code, through the variety of network(s) including Internet 2618 and LAN 2615, network link 2614 and communication interface 2613. In the Internet example, when the system 2601 acts as a network server, it might transmit a requested code or data for an application program running on client(s) 2620 and/or 2621 through Internet 2618, gateway/firewall 2617, local area network 2615 and communication interface 2613. Similarly, it may receive code from other network resources.

The received code may be executed by processor 2605 as it is received, and/or stored in persistent or volatile storage devices 2608 and 2606, respectively, or other non-volatile storage for later execution. In this manner, computer system 2601 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with data replication functionality. It is intended that the specification and examples be considered as exemplary only, with a true scope and spirit of the invention being indicated by the following claims.

What is claimed is:

1. A computerized data storage system comprising:
   a. At least one host computer;
   b. A management terminal; and
   c. A storage system comprising:
      i. An interface operable to communicate with the at least one host computer;
      ii. A storage device comprising a plurality of data objects; and
      iii. A deduplication controller operable to perform a deduplication of data stored in the storage device, wherein the deduplication controller maintains a threshold with respect to allowed degree of deduplication, counts a number of links for each data object and does not perform deduplication when the counted number of links for the data object exceeds the threshold even if duplication is detected;
   wherein performing a deduplication comprises creating a plurality of links pointing from a plurality of virtual objects to one data object;
   wherein the data object is stored without performing deduplication when the counted number of links for the data object exceeds the threshold even if duplication is detected.

2. The computerized data storage system of claim 1, wherein the interface is a block interface and wherein the data object is a chunk.

3. The computerized data storage system of claim 1, wherein the interface is a network interface and wherein the data object is a file.

4. The computerized data storage system of claim 1, wherein the interface is a tape interface and wherein the data object is a backup file.

5. The computerized data storage system of claim 1, wherein the deduplication controller is operable to perform the deduplication in response to receipt of a write command by the interface.

6. A computerized data storage system comprising:
   a. At least one host computer;
   b. A management terminal; and
   c. A storage system comprising:
      i. An interface operable to communicate with the at least one host computer;
      ii. A normal reliability storage area;
      iii. A high reliability storage area;
      iv. A data migration controller operable to migrate data between the normal reliability storage area and the high reliability storage area; and
      v. A deduplication controller operable to perform deduplication of data stored in the normal reliability storage area or the high reliability data storage area, wherein the deduplication controller maintains a threshold with respect to allowed degree of deduplication and counts a number of links for each object; and wherein the deduplication controller is operable to cause the data migration controller to migrate a data object to the high reliability storage area when the counted number of links for the data object exceeds the threshold;
   wherein performing a deduplication comprises creating a plurality of links pointing from a plurality of virtual objects to one data object.

7. The computerized data storage system of claim 6, wherein the deduplication controller is further operable to cause the migration controller to migrate the data object to the normal reliability storage area from the high reliability storage area when the counted number of links for the data object falls below the threshold.

8. The computerized data storage system of claim 6, wherein the interface is a block interface and wherein the data object is a chunk.

9. The computerized data storage system of claim 6, wherein the interface is a network interface and wherein the data object is a file.

10. The computerized data storage system of claim 6, wherein the interface is a tape interface and wherein the data object is a backup file.

11. The computerized data storage system of claim 6, wherein the deduplication controller is operable to perform the deduplication in response to receipt of a write command by the interface.

12. A method performed by a storage system comprising an interface operable to communicate with at least one host computer and at least one storage device comprising a plurality of data objects, the method comprising:
    a. Determining whether a first data is duplicated in at least one duplicate data object;
    b. Maintaining a threshold with respect to allowed degree of deduplication;
    c. Counting a number of links for the at least one duplicate data object;
    d. If the first data is duplicated in the at least one duplicate data object and if the counted number of links does not exceed the threshold, performing deduplication of the data in the at least one duplicate data object; and
    e. If the counted number of links exceeds the threshold, not performing the deduplication of the data in the at least one duplicate data object;
    wherein performing a deduplication comprises creating a plurality of links pointing from a plurality of virtual objects to one data object;
    wherein the at least one duplicate data object is stored without performing deduplication when the counted number of links for the data object exceeds the threshold eve if deduplication is detected.

13. The method of claim 12, wherein the interface is a block interface and wherein the data object is a chunk.

14. The method of claim 12, wherein the interface is a network interface and wherein the data object is a file.

15. The method of claim 12, wherein the interface is a tape interface and wherein the data object is a backup file.

16. The method of claim 12, further comprising, before the determining, receiving a write request from the at least one host computer, the write request comprising the first data.

17. A method performed by a storage system comprising an interface operable to communicate with at least one host computer and at least one storage device comprising a plurality of data objects, the method comprising:
    a. Determining whether a first data is duplicated in at least one duplicate data object of the plurality of data objects;
    b. Maintaining a threshold with respect to allowed degree of deduplication;
    c. Counting a number of links for the at least one duplicate data object;
    d. If the first data is duplicated in the at least one duplicate data object, performing deduplication of the data in the at least one duplicate data object; and
    e. If the counted number of links exceeds the threshold, migrating the at least one duplicate data object to a high reliability storage area;
    wherein performing a deduplication comprises creating a plurality of links pointing from a plurality of virtual objects to the at least one duplicate data object.

18. The method of claim 17, wherein the interface is a block interface and wherein the data object is a chunk.

19. The method of claim 17, wherein the interface is a network interface and wherein the data object is a file.

20. The method of claim 17, wherein the interface is a tape interface and wherein the data object is a backup file.

21. The method of claim 17, further comprising, before the determining, receiving a write request from the at least one host computer, the write request comprising the first data.

* * * * *